(12) United States Patent
Coode et al.

(10) Patent No.: US 10,979,234 B2
(45) Date of Patent: Apr. 13, 2021

(54) SECURE LOCKING OF PHYSICAL RESOURCES USING ASYMMETRIC CRYPTOGRAPHY

(71) Applicant: SERA4 LTD., Waterloo (CA)

(72) Inventors: David Coode, Waterloo (CA); Daniel Galeano, Ottawa (CA); Jerod Klink, Kitchener (CA); Raj Mody, Brampton (CA); Andrew Kuikman, Kitchener (CA)

(73) Assignee: SERA4 LTD., Waterloo (CA)

( * ) Notice: Subject to any disclaimer, the term of this patent is extended or adjusted under 35 U.S.C. 154(b) by 273 days.

(21) Appl. No.: 15/903,461

(22) Filed: Feb. 23, 2018

(65) Prior Publication Data

US 2018/0248704 A1 Aug. 30, 2018

Related U.S. Application Data

(60) Provisional application No. 62/463,150, filed on Feb. 24, 2017, provisional application No. 62/515,368, filed on Jun. 5, 2017.

(51) Int. Cl.
| | |
|---|---|
| *H04L 9/32* | (2006.01) |
| *H04L 9/08* | (2006.01) |
| *G07C 9/00* | (2020.01) |
| *H04L 29/06* | (2006.01) |
| *H04W 12/04* | (2021.01) |

(Continued)

(52) U.S. Cl.
CPC ........ *H04L 9/3268* (2013.01); *G07C 9/00309* (2013.01); *G07C 9/00571* (2013.01); *G07C 9/00944* (2013.01); *H04L 9/0825* (2013.01); *G07C 2009/00412* (2013.01); *H04L 63/0823* (2013.01); *H04W 4/80* (2018.02); *H04W 12/04* (2013.01); *H04W 12/06* (2013.01)

(58) Field of Classification Search
CPC . H04L 9/3268; H04L 9/0825; G07C 9/00309; G07C 9/00571; G07C 9/00944; H04W 4/80; E05B 47/0001; E05B 47/0012
See application file for complete search history.

(56) References Cited

U.S. PATENT DOCUMENTS

| | | | | |
|---|---|---|---|---|
| 9,822,553 | B1* | 11/2017 | Ho | ....................... E05B 47/0012 |
| 2007/0132550 | A1* | 6/2007 | Avraham | ................. G07C 1/32 |
| | | | | 340/5.21 |

(Continued)

*Primary Examiner* — Hee K Song
(74) *Attorney, Agent, or Firm* — Perry + Currier Inc.

(57) ABSTRACT

Digital certificates are signed by a server's private key and installed at lock controllers that restrict access to physical resources. The server's public key is distributed to lock controllers and to wireless mobile devices operated by users who are given access to primary locks which secure access to physical resources, and secondary locks, which retain the primary locks within operable vicinity to the physical resources. Additionally, tertiary locks may secure access to internal components of the primary or secondary locks. When a wireless mobile device enters the vicinity of a lock controller, the digital certificate of the lock controller is used as the basis for encrypted communications between the wireless mobile device and the lock controller. Wireless mobile devices may be used to gather evidence of integrity of the locks after use. Lock controllers may be powered by energy harvesting devices.

17 Claims, 16 Drawing Sheets

(51) Int. Cl.
*H04W 4/80* (2018.01)
*H04W 12/06* (2021.01)

(56) References Cited

U.S. PATENT DOCUMENTS

| | | | | |
|---|---|---|---|---|
| 2007/0290797 A1* | 12/2007 | Harkins | ............ | G07C 9/00103 340/5.73 |
| 2008/0162848 A1* | 7/2008 | Broyles | ............... | G06F 12/1433 711/163 |
| 2009/0183541 A1* | 7/2009 | Sadighi | ............. | G07C 9/00103 70/263 |
| 2011/0084799 A1* | 4/2011 | Ficko | ................ | G07C 9/00904 340/5.65 |
| 2012/0096909 A1* | 4/2012 | Hart | ....................... | G08C 17/02 70/278.1 |
| 2013/0087562 A1* | 4/2013 | Thukral | ................ | B65D 55/14 220/210 |
| 2014/0313334 A1* | 10/2014 | Slotky | ................ | G01N 21/9515 348/148 |
| 2014/0375422 A1* | 12/2014 | Huber | ................ | G07C 9/00571 340/5.61 |
| 2015/0116084 A1* | 4/2015 | Yeara | .................. | G07C 9/00309 340/5.65 |
| 2015/0206367 A1* | 7/2015 | Goldman | ........... | G07C 9/00571 340/5.61 |
| 2015/0235496 A1* | 8/2015 | Vecchiotti | .......... | G07C 9/00103 340/5.61 |
| 2016/0049027 A1* | 2/2016 | Soldner | ................ | G07C 9/00174 340/5.61 |
| 2017/0103595 A1* | 4/2017 | Taylor | .................... | E05B 35/00 |
| 2017/0345236 A1* | 11/2017 | Kuenzi | ............. | G07C 9/00904 |
| 2017/0345237 A1* | 11/2017 | Kuenzi | ............. | G07C 9/00119 |
| 2018/0114387 A1* | 4/2018 | Klink | .................... | H04W 12/02 |
| 2018/0179786 A1* | 6/2018 | Johnson | ............ | G07C 9/00174 |
| 2020/0027295 A1* | 1/2020 | Bigert | ................ | G07C 9/00309 |

* cited by examiner

SECURE LOCKING OF PHYSICAL RESOURCES USING ASYMMETRIC CRYPTOGRAPHY

FIELD

This invention relates to security, and more specifically, to secure locking of physical resources using asymmetric cryptography.

BACKGROUND

Known techniques for securing physical resources, such as buildings, include providing an electronic lock to a door and then configuring the lock to respond to the presence of an access card, key code, or similar. More recent systems use smartphones to open electronic locks.

When used to secure physical resources located at remote locations, portable electronic locks tend to be used, so that administrators may easily secure a physical resource without the need for installing dedicated wiring, and so that administrators may easily swap, replace, relocate, and perform maintenance on the locks. Portable locks, however, are prone to theft and misplacement. Furthermore, for locks used to protect remote or infrequently accessed physical resources, those trying to gain unauthorized access to the physical resource, or to steal or tamper with its locks, have much more time and ability to do so without timely detection.

In industrial or enterprise contexts, where access to portable electronic locks is monitored by a central system, one may not be confident that any particular lock is properly securing the properly physical resource merely by the detection of a signal indicating that the lock is closed. Indeed, the lock may be improperly placed to secure the wrong physical resource, or may have been removed off site. Hence, conventional techniques for using electronic locks are incapable of adequately securing such resources.

SUMMARY

According to various aspects of the present invention, a server stores a public and private key pair. Digital certificates are signed by the server's private key and installed at electronic lock controllers. The electronic lock controllers are coupled to primary locks which secure access to physical resources, and secondary locks, which retain the primary locks within operable vicinity to the physical resources. Additionally, tertiary locks may secure access to internal components of the primary or secondary locks. The server's public key is distributed to the lock controllers and to wireless mobile devices operated by users who are permitted to open any combination of the primary, secondary, and tertiary locks.

When a wireless mobile device enters the vicinity of a lock controller, the digital certificate of the lock controller is used as the basis for encrypted communications between the wireless mobile device and the lock controller. Lock-access data that has been digitally signed by the server's private key is transmitted to the wireless mobile device to provide to the lock controller to unlock a particular lock. The lock controller validates the lock-access data and grants access conditionally based on time, version, and/or identity data provided within the lock-access data.

The wireless mobile devices may be used to provide evidence of the integrity of the locks after the user interacts with the locks and before the user leaves the vicinity. The lock controllers may also include sensors which can provide evidence that the locks have been tampered with.

The lock controllers may be powered by energy harvesting devices, including devices which may be operated by a user to charge the lock controllers before obtaining access to the locks.

BRIEF DESCRIPTION OF THE DRAWINGS

The drawings illustrate, by way of example only, embodiments of the present invention.

DETAILED DESCRIPTION

The present invention aims to solve at least one of the problems discussed above. Specifically, the present invention assigns unique cryptographic keys to different electronic locks, so that encrypted and authenticated channels can be established with mobile devices of users having access permission to gain access to physical resources protected by the electronic locks. Digital signatures are used to help mobile devices avoid communicating with imposter locks and to prevent mobile devices from using forged access data to open electronic locks.

The lock used to secure access to a physical resource may be referred to as a primary lock. A primary lock may also be coupled with a secondary lock which retains the primary lock within operable vicinity to the physical resource to prevent theft or misplacement of the primary lock. Access permissions may be selectively granted so that some users have access to a primary lock to access the physical resource, whereas other users have access to the secondary lock or both the primary and secondary locks for relocating, upgrading, replacing, or maintenance of the primary lock. The secondary lock can be used to tether a portable electronic lock to a particular location, and thereby affords significant flexibility and security to large enterprises which frequently install, remove, and/or relocate, smart locks across many different security sites.

A tertiary lock may secure access to internal components of the primary lock, the secondary lock, or both, and may be accessed by another group of users.

Securement of the primary lock, the secondary lock, or both, may be verified using sensors or imaging devices. The sensors or imaging devices provide contextual information to assist an administrator to verify proper securement of the physical resource, the primary lock, the secondary lock, or the tertiary lock.

Further aspects and advantages of the present invention will be apparent from the below detailed description. Where the term "lock" is used in the singular, it is to be understood that this is for the sake of explanation only, and that one or more locks may be used. For example, where it is stated that the electronic lock controller opens one of the locks, this is to be understood to mean that the electronic lock controller can open one or more primary locks, one or more secondary locks, one or more tertiary locks, or any combination thereof.

Figure 1:
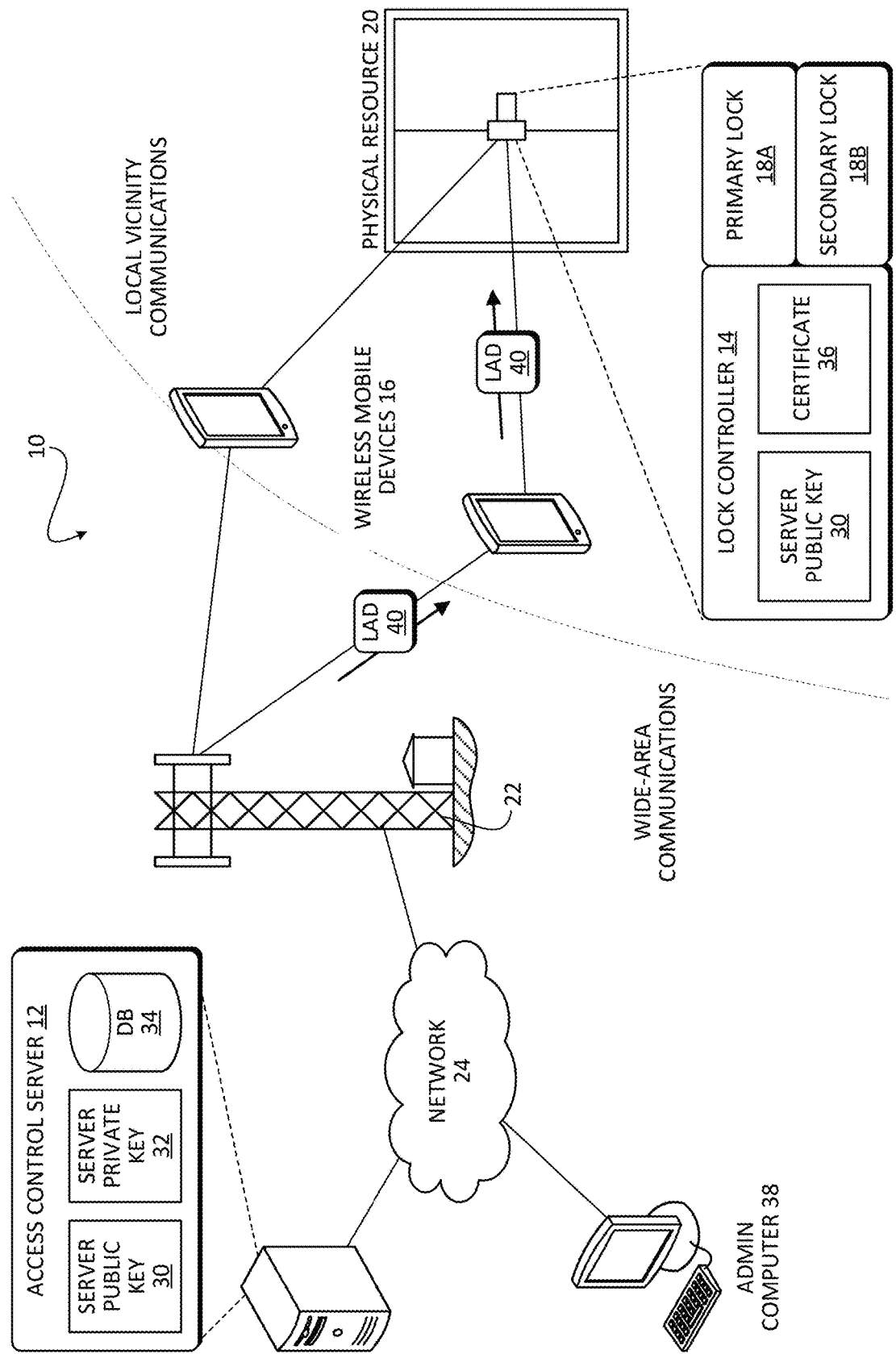
FIG. 1 is a diagram of a system for providing secure access to a physical resource.

FIG. 1 depicts a system 10 for providing secure access to a physical resource according to the present invention. The system 10 includes an access control server 12, an electronic lock controller 14, and a plurality of wireless mobile devices 16. The lock controller 14 unlocks a primary lock 18A, a physical lock that restricts access to a physical resource 20, and a secondary lock 18B, a physical lock that retains the primary lock within operable vicinity to the physical resource (primary lock 18A and secondary lock 18B may be referred to generally as locks 18). Unlocking is based on access requests made by the wireless mobile devices 16, as controlled by access permissions managed by the access control server 12. The system 10 can include any number of access control servers 12, electronic lock controllers 14, and wireless mobile devices 16 to restrict access to any number of physical resources 20. The present invention includes asymmetric cryptographic techniques that allow for flexible, secure, and readily configurable control of access to the locks 18 of the physical resource 20.

The physical resources 20 guarded by the present invention may be situated at remote geographic locations. Examples of such resources include cell tower shacks, oilfield installations, construction equipment and sites, remote industrial facilities, an similar. The physical resources 20 guarded by the present invention may include industrial or commercial fixtures, such as storage cabinets, lockers, storerooms, yards, and similar. The present invention is particularly suited for physical resources that are normally accessed from one side (e.g., a shack that is not normally occupied, a cabinet, etc.). In addition, the present invention is particularly suited for physical resources that are located remote from grid power and wired computer networks or that are not particularly suited for connection to grid power and wired computer networks. Further, the present invention is particularly suited for physical resources which are stored in structural containers or behind structural barriers. A salient example of a physical resource 20 is a cell tower shack that contains valuable equipment such as network devices and high-capacity batteries within a cabinet, where a primary lock may be used to secure the cabinet closed, while a secondary lock retains the primary lock to a door of the cabinet so that the primary lock cannot be removed from the cabinet. Another example is a cell tower shack which is surrounded by a security fence, where a primary lock may be used to secure a gate in the security fence, while a secondary lock retains the primary lock to the fencing so that the primary lock cannot be removed from the vicinity of the gate. That said, the preceding are merely examples of the types of physical resources 20 suitable for use with the present invention and they should not be taken as unduly limiting.

The wireless mobile devices 16 are configured to connect to the access control server 12 via a computer network 24. The computer network 24 includes one or more internet protocol (IP) networks, such as an intranet, a local-area network, a wide-area network, a virtual private network (VPN), a Wi-Fi network, the internet, and similar. Any suitable protocol, such as TLS and HTTPS, can be used for secure data communications. The computer network 24 can include cellular/mobile network infrastructure 22 that operates according to any type of cellular/mobile network technology and standard (e.g., 2G, 3G, 4G, GSM, UMTS/UTRA, HSPA, LTE, CDMA, WiMAX, etc.) that provides for relatively long-range wireless communications. Generally, the computer network 24 uses grid power and has wired components (e.g., Ethernet, fiber optics, etc.).

The access control server 12 stores a public key 30 and a corresponding private key 32. The keys 30, 32 may be generated according to any asymmetric cryptographic scheme or equivalent cryptographic scheme. For example, NIST-approved elliptical curve cryptography can be used. The access control server 12 further stores a database 34 that stores a plurality of user accounts for users of the wireless mobile devices 16 to be provided with secure access to the locks 18 of the physical resource 20. One or more administrator computers 38 can be provided to manage the access control server 12, and particularly manage the user accounts and which users have access to which physical resources, and which locks, at what times.

The lock controller 14 stores a digital certificate 36 that includes a public key and a corresponding private key for the particular lock 18, which enables access to unlock the primary lock 18A or to unlock the secondary lock 18B according to a particular user's access permissions. Each lock controller 14 has its own unique digital certificate 36. The public and private keys of the lock controller 14 also accord to the selected asymmetric cryptographic scheme. Keys of any suitable bit length (e.g., 64-bit, 128-bit, 256-bit, etc.) can be employed based on the desired level of security. In addition, the digital certificate 36 has been previously digitally signed by the private key 32 of the server 12. Signing of the digital certificate 36 with the private key 32 of the server 12 is preferably done in a secure environment, such as within a factory that manufactures lock controllers and provisions access control servers. The lock controller 14 further stores the public key 30 of the access control server 12.

The wireless mobile devices 16 are carried by users who are to be granted access to the locks 18 of the physical resource 20. Access permissions are associated with user accounts in the database 34. A user logs into his/her account, using for example a unique username and password, from their wireless mobile device 16 to obtain from the server 12 lock-access data 40 that grants access to the physical resource 20, to remove the primary lock 18A, or grants another permission with respect to the lock controller 14.

In this embodiment, the wireless mobile device 16 and electronic lock controller 14 are configured to mutually connect for data communications when within local vicinity of each other. That is, each of the wireless mobile devices 16 and the electronic lock controller 14 has a local-range communications interface, which can include a chipset and/or antenna/transceiver operable according to any suitable short-range wireless communications scheme (e.g., Bluetooth, Bluetooth Smart, Bluetooth Low Energy or BLE, Wi-Fi, ZigBee, Google Thread, Near Field Communication or NFC, etc.), short-range audio communications scheme, short-range infrared communications scheme, or similar technology. The particular short-range communications scheme selected is not specifically limited, though its range is shorter than that provided by the computer network 24. However, because the present invention concerns granting physical access to remote physical resources and locks that may not have access to grid power, it is contemplated that shorter-ranged schemes will generally be more advantageous due to reduced power consumption. The presently preferred short-range communications schemes include Bluetooth and BLE.

In other embodiments, the wireless mobile device 16 and electronic lock controller 14 are configured to mutually connect for data communications over the computer network 24 (e.g., over the internet).

Concerning operation of the system, in overview, the server 12 digitally signs lock-access data 40 specific to the user and the lock controller 14 using its private key 32 prior to transmitting the lock-access data 40 to a wireless mobile device 16 of a user who wishes to unlock one of the locks 18. The wireless mobile device 16 obtains the lock controller's server-signed digital certificate 36 from the lock controller 14, when in vicinity of the lock controller 14, and validates the authenticity of the certificate 36, and thus the authenticity of the lock controller 14 itself, using the server's public key 30. Once validated, communications between the wireless mobile device 16 and the lock controller 14 can be secured on the basis of the lock controller's digital certificate 36. The wireless mobile device 16 can safely encrypt the lock-access data 40 using the lock controller's public key and transmit the encrypted lock-access data 40 to the electronic lock controller 14, which can use its private key to decrypt the lock-access data 40. The lock controller 14 can validate the authenticity of the lock-access data 40 using the server's public key 30. If the lock-access data 40 is successfully validated, the lock controller 14 performs one or more operations defined by the lock-access data 40, such as unlocking one of the locks 18. Similar processes can be used to allow the server 12 to update settings of the lock controller 14, to communicate data (e.g., log data) from the lock controller 14 to the server 12, and to confirm that the primary lock 18A has been properly locked and remains in the vicinity of the physical resource 20 after access to the resource 20 is completed. The above process can also be used to lock one of the locks 18, although it is contemplated that unlocking one of the locks 18 will generally be more of a security concern.

It is advantageous that the wireless mobile device 16 and the lock controller 14 communicate using a digital certificate assigned to the lock controller 14. The server 12 signs both the lock-access data 40 and the lock controller's digital certificate 36, advantageously allowing the lock controller 14 and the wireless mobile device 16, respectively, to validate the authenticity of the lock-access data 40 and the lock controller's digital certificate 36. This allows the lock controller 14 to detect forged lock-access data and respond appropriately by, for example, not opening the lock 18, logging an unauthorized access attempt, issuing an alarm, or similar. In addition, the wireless mobile device 16 can detect an impostor lock controller and respond appropriately by, for example, not transmitting the lock access data, notifying the server 12 of the location of the unauthorized lock controller, and similar. The present invention will be discussed in further detail below and additional aspects and advantages will become apparent.

Figure 2:
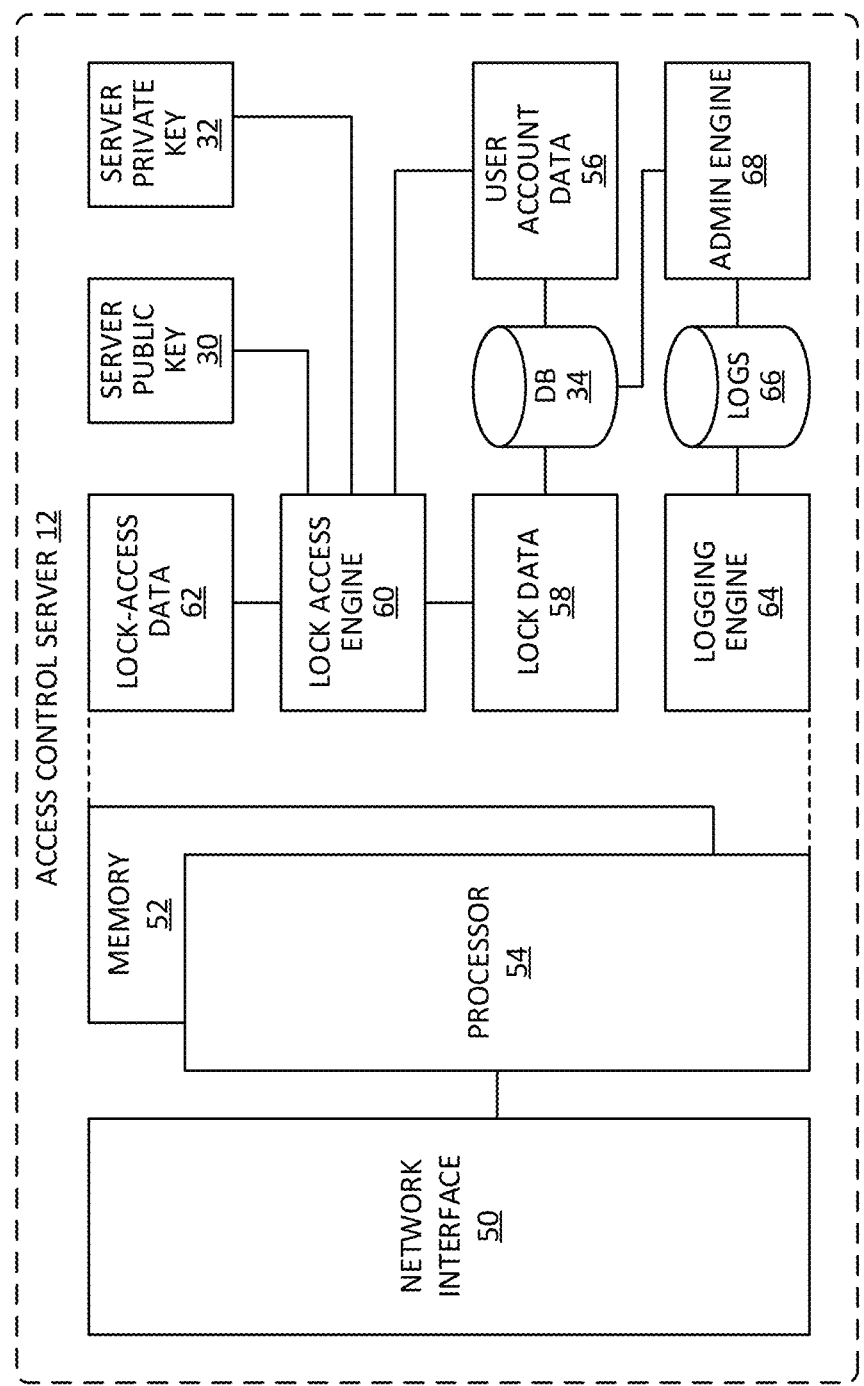
FIG. 2 is a diagram of an access control server.

FIG. 2 shows a block diagram of the access control server 12. The server 12 is one example of a server that can be used with the system 10. The term server as used herein refers to a single server or multiple cooperating servers.

The server 12 includes a network interface 50, memory 52, and a processor 54. The network interface 50 is configured for bidirectional data communications through the computer network 24. The network interface 50 includes a network adaptor and driver suitable for the type of network 24. The memory 52 includes any combination of read-only memory (ROM), random-access memory (RAM), flash memory, magnetic storage, optical storage, and similar for storing instructions and data as discussed herein. The processor 54 includes one or more central-processing units (CPU), microcontrollers, microprocessors, processing cores, field-programmable gate arrays (FPGA), and similar. All or some of the memory 52 may be integrated with the processor 54. The processor 54 and memory 52 cooperate to execute instructions to cause the server 12 to perform the functionality discussed herein.

As mentioned above, the server 12 stores the server's public and private keys 30, 32 in addition to the database 34. The database 34 stores users account data 56 and lock data 58.

The server 12 further includes a lock-access engine 60 that is configured to generate lock-access data 62 based on the lock data 58 and the user account data 56 to allow access to unlock specific locks, e.g. to access specific physical resources or to access specific locks on specific physical resources, by specific users at specific times. The lock-access engine 60 is further configured to digitally sign lock-access data 62 using the server's private key 32. Lock-access data 40 discussed above is an example of lock-access data 62. The lock-access engine 60 is configured to manage log ins by users and transmit appropriate lock-access data 62 via the network interface 50 to respective wireless mobile devices 16. In addition, the lock-access engine 60 can be configured to deploy the server's public key 30 to the wireless mobile devices 16.

The server 12 maintains the lock-access data 62 in association with the plurality of user accounts stored as user account data 56. The lock-access engine 60 is configured to transmit lock-access data 62 to a particular wireless mobile device 16 upon the wireless mobile device 16 establishing a connection to the server 12 via the network interface 50 and the user of the wireless mobile device 16 successfully logging into their account.

The lock-access engine 60 is configured to handle continued access to physical resources and locks while at the same time allowing for access permissions to be revoked. This can be achieved in several ways. In one example, the lock-access engine 60 periodically regenerates the lock-access data 62 with updated permitted access schedules, where such regeneration can be ceased for specific users in order to deny access to the physical resource or lock to such users. Users log into the server 12 to obtain fresh lock-access data 62 for the period. A user who is denied access to a resource or lock will not receive fresh lock-access data 62 for the period and instead will bear expired lock-access data. The risk of unauthorized access is thus inversely proportional to the frequency of regeneration. That is, if lock-access data 62 for each user is regenerated each night to grant access for the following day, then a user whose permission is revoked for a particular resource will still have access for, at most, one day following the revocation. To complement this technique, particularly when a short period of regeneration is selected, the database can further store a regeneration end time for each user, after which lock-access data 62 will no longer be regenerated. This can allow for fresh lock-access data 62 to be generated periodically (e.g., daily, weekly, etc.) within a larger period (e.g., one month), and may be useful in that the administrator does not have to return to the server 12 to actively revoke a permission. In an example use case, a regeneration end time for employees is set to one year and a regeneration end time for contractors is set to the time in the future that the contract is expected to end.

In another example of revoking permissions, the lock data 58 includes version data that is provided to the lock controllers 14. The lock-access engine 60 updates the version data when access permission to any user or users is revoked. Users who are not revoked obtain lock-access data 62 containing the updated version data, which matches that sent by the lock controllers 14, thereby permitting access. Users whose permissions are revoked can only present lock-access data that includes non-updated version data, and the lock controllers 14 are configured to ignore and/or log access requests bearing non-matching version data.

The above two techniques for revoking permissions can be used independently or combined.

The server 12 further includes a logging engine 64 configured to receive log data from deployed lock controllers 14 and to save long-term lock access logs 66.

The server 12 further includes an admin engine 68 configured to receive updates to user account data 56 and lock data 58. The admin engine 68 is configured to create, modify, and delete user accounts, as well as logically create, modify, and delete lock controllers 14. Further, the admin engine 68 is configured to set access permissions by creating lock-access data 62 for various combinations of users and lock controllers and to revoke access permissions, as needed, by updating version data and/or setting regeneration expiry times.

Figure 3:
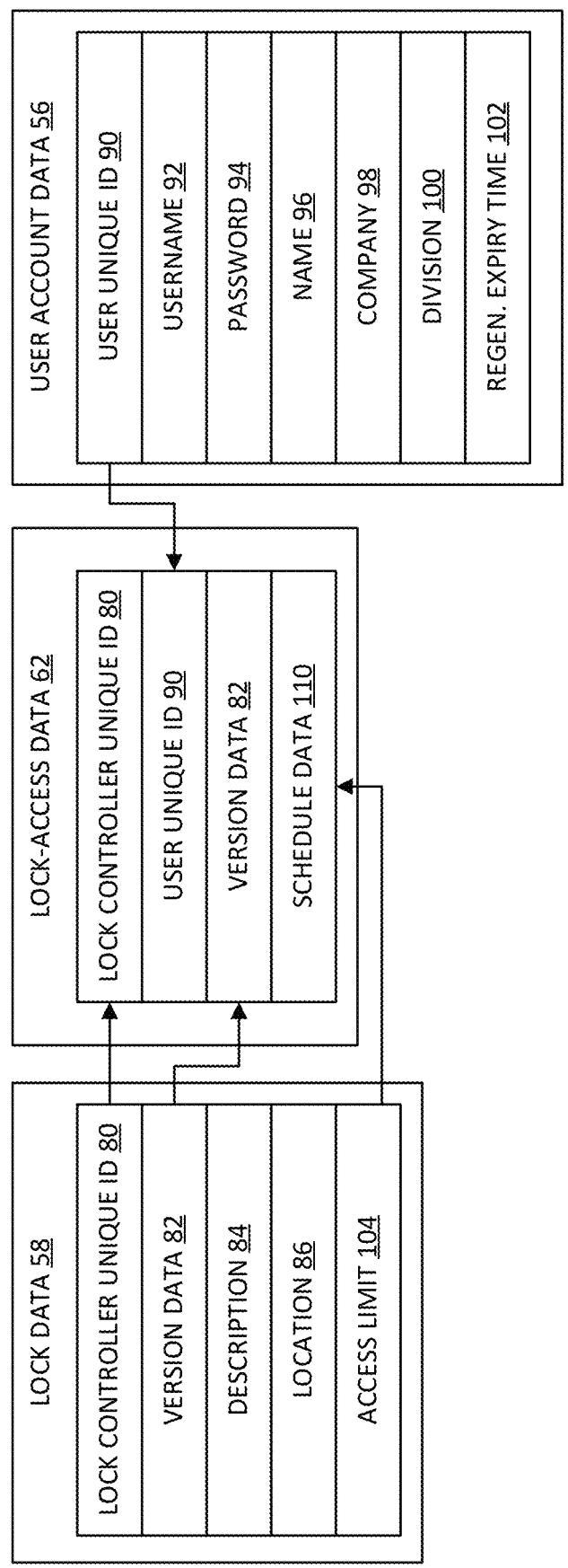
FIG. 3 is a diagram of data structures for users and lock controllers.

FIG. 3 shows data structures for lock data 58, lock-access data 62, and user account data 56.

An element of lock data 58 is mapped to a lock controller 14 by way of a lock controller unique identifier 80, which can be a serial number, an alphanumeric code, a hash, or similar kind of unique or pseudo-unique identifier. Lock data 58 further includes version data 82, which is a number, alphanumeric code, or similar data element representative of the current version of access for the lock controller 14. Version data 82 can be changed to revoke access to a particular user by informing all other users of the new version, but not informing the particular user. Lock data 58 can further include a text description of the lock controller 14 or the respective resource 20 or lock 18 and a location 86 (e.g., geographic coordinates) of the lock controller 14. The lock data 58 may also store an access limit 104 for each lock controller to specify the maximum access time that will provided in schedule data, so as to force users to obtain fresh lock-access data more frequently for highly secure resources. That is, the access limit 104 defines the maximum validity period for a particular element of lock-access data 62 (e.g., 24 hours for highly secure locations, one month for lower security locations, etc.). This ensures that users have their credentials authenticated at frequency commensurate with the security required for the particular resource or lock.

An element of user account data 56 is mapped to a user by way of a user unique identifier 90, which can be a number, an alphanumeric code, a hash, or similar kind of unique or pseudo-unique identifier. The user unique identifier 90 can correspond to the user or the wireless mobile device 16 assigned to the user. Examples of user unique identifiers 90 include an email address, an employee number, a username, a hash of the user's name and birthdate, a hash of the username and/or password, a phone number, a phone IMEI, a MAC address, and similar. User account data 56 further stores a username 92 and password 94 for each user to authenticate with the server 12, and may store additional information about the user, such as name 96, company 98, division 100, and similar. When access-data regeneration is used, the user account data 56 may also store a regeneration expiry time 102 for each user, so that permission may be globally granted/revoked for each user.

The lock-access data 62 defines access permissions to unlock a lock 18 for a user of a wireless mobile device 16. Accordingly, each element of lock-access data 62 includes a lock controller unique identifier 80 of the specific lock controller 14/lock 18 for which access is being granted, version data (if used) for the specific a lock controller 14, access schedule data 110 that includes at least one start time and at least one end time, and may further include a user unique identifier 90 for the specific user or device being granted access. The schedule data 110 can include a date and/or time of day defining the beginning and ending of a period of permitted access for a particular user. When the lock-access data 62 is provided by the wireless mobile device 16 to the lock controller 14, the lock controller 14 checks that the received lock-access data 62 matches comparable data stored at the lock controller 14 before opening the lock. That is, the lock controller 14 only opens the lock 18 after the identity and time conditions are met.

Figure 4:
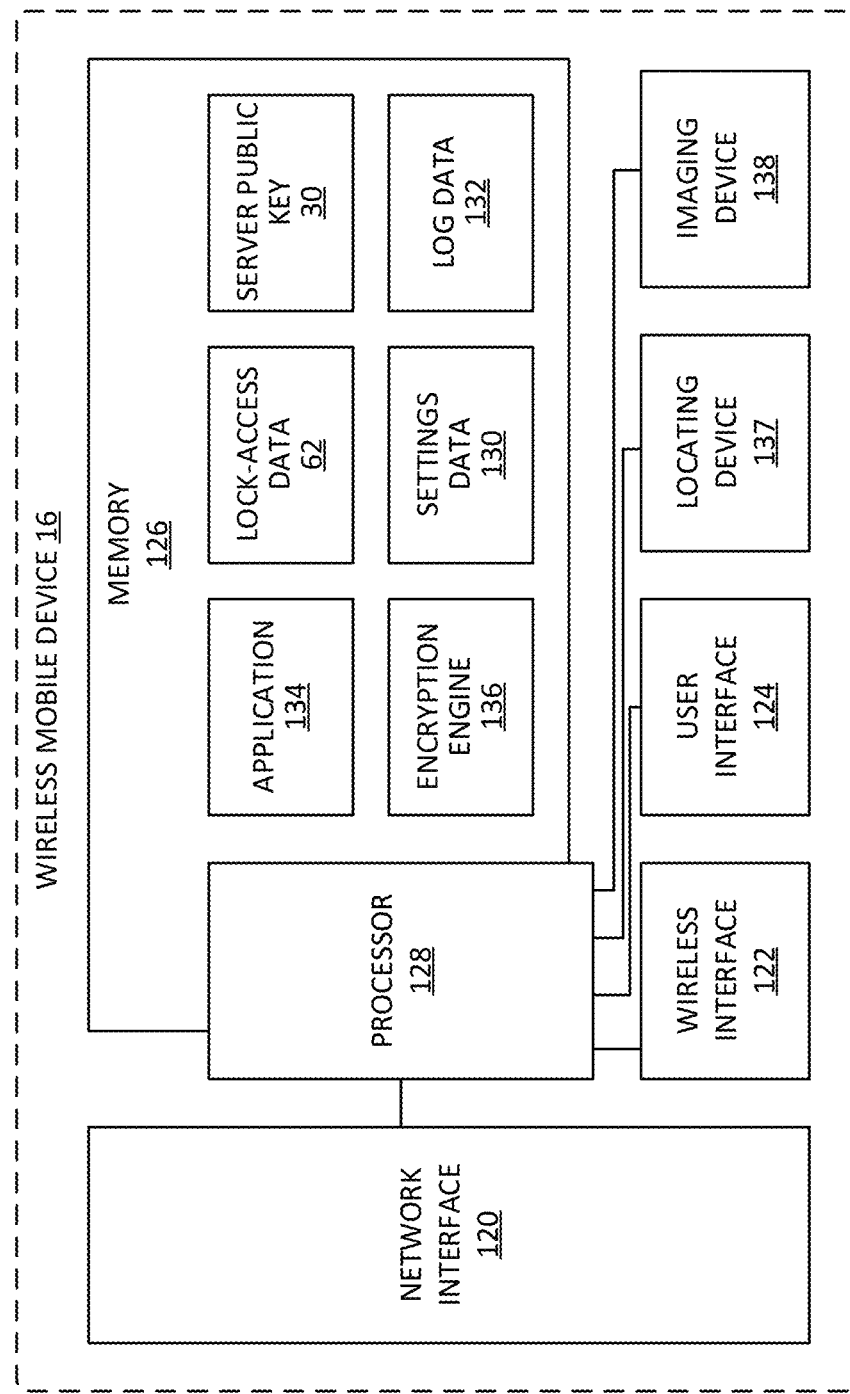
FIG. 4 is a diagram of a wireless mobile device.

FIG. 4 shows a block diagram of a wireless mobile device 16. The wireless mobile device 16 is one example of a wireless mobile device that can be used with the system 10.

The wireless mobile device 16 includes a network interface 120, a wireless interface 122, a user interface 124, memory 126, and a processor 128. The network interface 120 is configured for bidirectional data communications via the computer network 24. The network interface 120 includes a network adaptor and driver suitable for the type of network 24. The wireless interface 122 includes a short-range communications interface, such those discussed above (e.g., Bluetooth, BLE, etc.). The network interface 120 and the wireless interface 122 may be the same interface configured differently. The user interface 124 includes a display device, a touchscreen, a keyboard, a microphone, a speaker, or a combination of such. The memory 126 includes any combination of ROM, RAM, flash memory, magnetic storage, optical storage, and similar for storing instructions and data as discussed herein. The processor 128 includes one or more CPUs, microcontrollers, microprocessors, processing cores, field-programmable gate arrays FPGAs, and similar. All or some of the memory 126 may be integrated with the processor 128. The processor 128 and memory 126 cooperate to execute instructions to cause the wireless mobile device 16 to perform the functionality discussed herein.

The wireless mobile device 16 is configured to store the server public key 30 and further store any lock-access data 62 to be used to unlock a lock 18, whether to gain access to a physical resource 20 or to remove a primary lock 18A from a physical resource 20. The wireless mobile device 16 can further be configured to temporarily store settings data 130 in transit from the server 12 to a particular lock controller 14 and log data 132 in transit from a particular lock controller 14 to the server 12. The wireless mobile device 16 is configured to act as a data proxy between the server 12 and the lock controller 14. Hence, the wireless mobile device 16 may be required to temporarily store settings data 130 and/or log data 132 at times when long-range data communications are not available through the network interface 120. For example, a physical resource 20 may be located outside of cellular coverage and the wireless mobile device 16 holds log data destined for the server 12 until the wireless mobile device 16 returns to coverage. Likewise, the settings data destined to the lock controller 14 may be transmitted to the wireless mobile device 16 before the wireless mobile device 16 leaves coverage.

The wireless mobile device 16 may further include a locating device 137 and an imaging device 138. The locating device 137 may include a global positioning system (GPS) device or radio frequency locating device, Wi-Fi positioning system (WPS), or other locating device, which can be used to track the location of wireless mobile device 16 in relation to physical resources 20. The imaging device 138 may include a camera, which can be used to capture an image of the physical resource 20, primary lock 18A, secondary lock 18B, or a visual aid in the vicinity of the physical resource 20, to obtain evidence that the physical resource 20 is properly secured.

The wireless mobile device 16 further includes an application 134 and an encryption engine 136. The application 134 can be configured to provide human-intelligible descriptions for any stored lock-access data 62, such as resource description and location, or to hide lock-access data 62 from the user. Similarly, the application 134 can be configured to provide human-intelligible descriptions for any stored server public keys 30, such as owner name, or to hide server public keys 30 from the user. The application 134 is configured to manage connections and account credentials with the server 12 and to receive lock access data 62 from the server 12. The application 134 is further configured to interface with the encryption engine 136.

The application 134 can be further configured to accept status notifications from lock controllers 14 in vicinity of the wireless mobile device 16 and to respond by retrieving data (e.g., log data) from a lock controller 14 and transporting such data to the server 12 or by obtaining data (e.g., version data or other settings data 130) from the server 12 and transporting such data to the lock controller 14. The application 134 can be configured to facilitate such transport of data irrespective of whether a particular lock controller 14 is to be accessed by the wireless mobile device 16. That is, a wireless mobile device 16 can act as a wireless data proxy between electronic lock controllers 14 and the server 12. Transporting these kinds of data can be hidden from the user, as no user interaction is required. The application 134 can further be configured to use the encryption engine 136 to encrypt data bound a lock controller 14 using that lock controller's public key.

The encryption engine 136 is configured to use the server's public key 30 to validate the authenticity of any certificate provided by electronic lock controllers 14, and to encrypt lock-access data 62 received from the server 12 using validated public keys of the lock controllers 14. The application 134 is configured to transmit any messages containing encrypted lock-access data 62 to the respective electronic lock controllers 14 via the wireless interface 122.

The application 134 can further be configured to handle discovery/pairing with electronic lock controllers 14, as well as setup and expiry of short-range communications sessions with electronic lock controllers 14, according to the particular communications scheme used (e.g., Bluetooth, BLE, etc.)

The application 134 can be further configured to ensure that a user, having manipulated one of the locks 18, properly secures the lock 18. In some instances, the application 134 can further be configured to ensure that the user provides evidence of integrity of the lock 18, or the physical resource 20 protected by it, where applicable, to the owners or administrators of the physical resource 20 or lock 18.

One way in which the application 134 can be configured to ensure the integrity of a physical resource 20 or lock 18 is for the application 134 to notify the user as he or she closes a lock 18. Notification can be performed using the user interface 124 to generate an audio, visual, or other signal. Alternatively, the application 134 can be configured to track the location of the user using the locating device 137, and can notify the user that a lock 18 has not been closed after the user has left the vicinity of the lock 18. In either case, the lock controller 14 includes sensors or switches which detect that the shackle or other physical locking mechanism has returned to its locked position. The lock controller 14 is configured to transmit a respective signal to the wireless mobile device 16 through the appropriate communications interface based on the detection.

Where the application 134 is configured to notify a user after the user has left the vicinity of a lock 18 without closing the lock 18, the application 134 can be configured to record an initial location of the user and lock 18, e.g. by tracking the GPS location of the wireless mobile device 16, starting when the lock 18 was opened, and by continuously comparing updated GPS locations of the wireless mobile device 16, at least until the lock 18 is locked again. Where the GPS location changes beyond a specified threshold from the initial location (e.g. 20+ meters away from the location of wireless mobile device 16 when the lock 18 was opened), the user is notified. If the lock 18 is closed, tracking of the user's location may cease. Since the location of the user is tracked only between lock 18 being opened and closed, a user's operation of the lock 18 can thereby be monitored without placing excessive power and data transfer requirements on the wireless mobile device 16 to continuously track the location of the user. Alternatively, or in conjunction with GPS tracking, a communications signal from the lock controller 14 can be monitored by the wireless mobile device 16 to determine proximity to the lock controller 14 and the associated lock 18. A notification can be sent to the user where the strength of the communications signal is no longer detected or has dropped below a specified threshold. A notification may also be sent to owners or administrators of the lock 18 or physical resource 20. Thus, evidence that a user has properly secured a lock can be recorded and gathered.

Another way in which the application 134 can be configured to ensure the integrity of a physical resource 20 or lock 18 is for the application 134 to prompt the user to provide visual evidence that the physical resource 20 and/or lock 18 is secured after closing the lock 18 and before leaving the vicinity of the lock 18. For example, upon detecting the closing of a lock 18, the application 134 can be configured to prompt the user to capture an image using imaging device 138 which verifies the integrity of the lock 18 and/or the physical resource 20.

Figure 5:
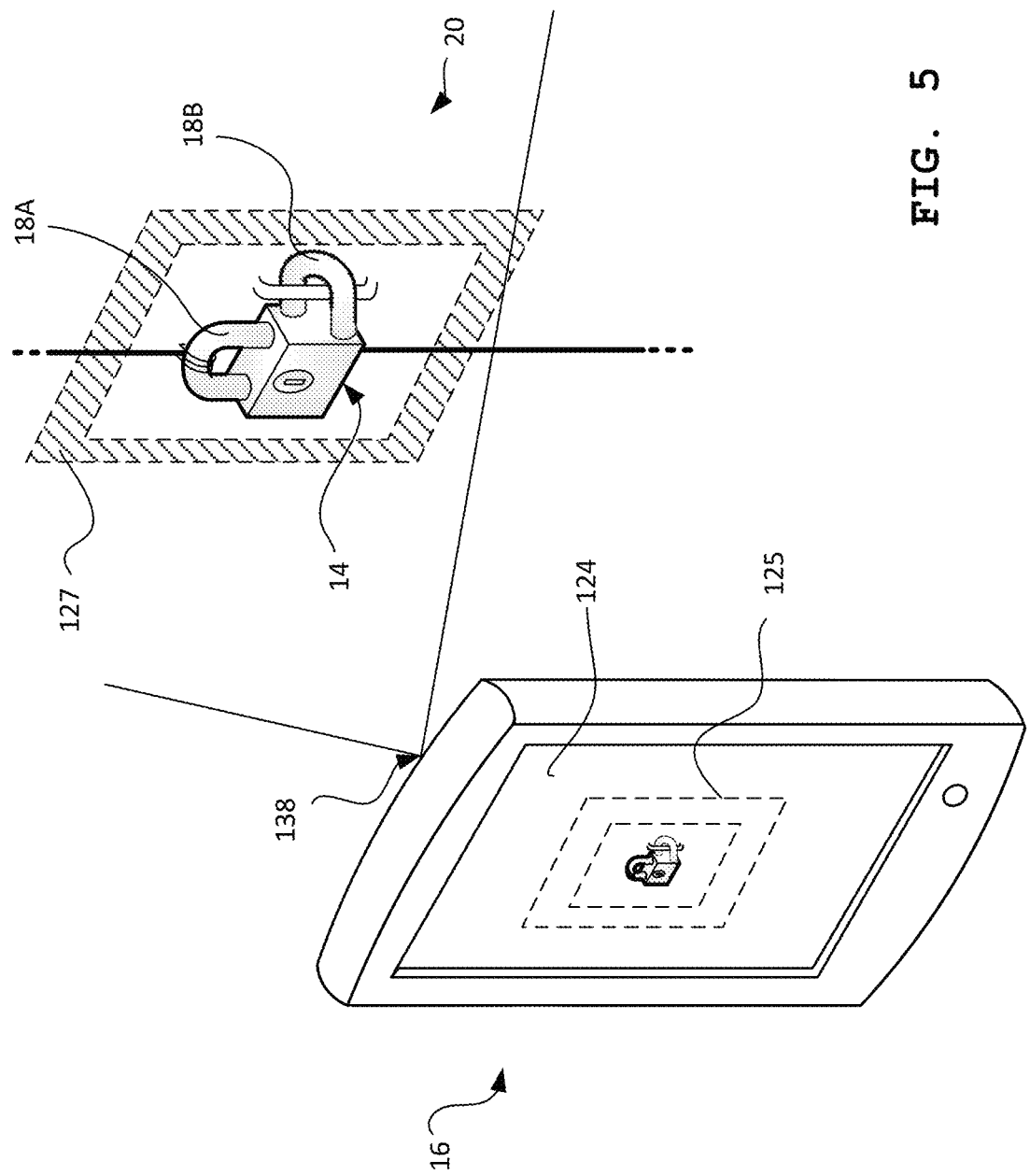
FIG. 5 is a diagram of a wireless mobile device capturing an image showing primary and secondary locks on a physical resource.

FIG. 5 shows a wireless mobile device 16 capturing an image of a lock on a physical resource. A lock controller 14 is coupled to a primary lock 18A which secures access to a physical resource 20, including two cabinet doors, and is coupled to a secondary lock 18B which secures the primary lock 18A and lock controller 14 to the physical resource 20. A wireless mobile device 16 is used to capture an image of the scene.

The application 134 can be configured to direct the user to capture an image of the lock by providing through user interface 124 instructions of a particular image to capture.

As shown, the user interface 124 displays an overlay 125 to assist the user to frame the lock 18 and/or physical resource 20 in the image. In other examples, the application 134 may display an example image or video through user interface 124 showing an example lock 18 properly secured and indicating how an image should be captured.

The application 134 is be configured to analyze the image to recognize the lock properly securing the physical resource. Processing may involve ensuring that the image includes the correct elements, including the lock 18 and physical resource 20, in the correct closed state, and at the correct location for lock 18. The application 134 may prompt the user to recapture the image if necessary. In some applications, the physical resource 20 and/or other objects in the vicinity of physical resource 20 may include distinctive visual markers meant to be included in the captured image. As shown, a distinctive border 127 of coloured tape is present in the scene. The distinctive border 127 spans the two cabinet doors of the physical resource 20, and thus is only unbroken when the cabinet doors are closed.

Image classification machine learning algorithms may be applied in the application 134 to determine, based on identification of the lock 18, physical resource 20, and/or visual markers such as the distinctive border 127, whether the lock 18 is properly secured in its proper location. Other distinctive visual markers may include a status LED, a barcode, a QR code, or similar. Some visual markers may be placed on a lock 18 itself, for example, at the tip of the lock's shackle which is made visible only when the lock is properly closed, to provide evidence that the lock is properly closed. Other visual markers, such as the distinctive border 127, may be placed on or near place where lock 18 secures the physical resource 20, to provide evidence that the lock 18 is secured on the correct physical resource 20. Thus, a visual marker may be situated on the physical resource 20, and the visual marker configured to appear broken when the physical resource 20 is improperly secured.

Additionally, the application 134 may be configured to register any of the above evidence, including the close event, image, time, and location information, with server 12 for processing and confirmation that the lock 18 is properly secured in its proper location. This can be achieved by the application 134 uploading the relevant data to the server 12 via the network 24.

The server 12 may run a server application which is configured to display evidence, including GPS tracking data, open/closed states of locks, additional sensor data from the electronic lock controllers, and the captured images, when queried. This evidence can be used to determine if, for example, a lock is being secured to the wrong environment/structure (and thus securing the wrong, or no, physical resource). This evidence may be used to corroborate a user's account of events, or may be used to flag a particular interaction with a lock as being improper.

The server application may alternatively or additionally be configured to notify/alert a system administrator if a lock was not closed/secured properly. One or more notification conditions can be used. Notification conditions can include, for example, where the server received an alert that a lock was opened, but has not received a report that the lock was closed within a certain period of time, or that the server has not received suitable evidence from the wireless mobile device that the lock was properly secured. Suitable notifications/alerts issued by the server include an email, text message, or prompt in a user-interface (e.g., dashboard) provided by the server 12.

Furthermore, although only a single secondary lock 18B is shown, it is to be understood that the use of secondary locks to secure the lock controller 14 and/or primary lock 18A within operable vicinity to a physical resource 20 can be extended to the use of multiple secondary locks 18B. Additional secondary locks 18B may be used to secure the lock controller 14 and/or primary lock 18A to other points in the vicinity of the physical resource 20. Alternatively, additional secondary locks 18B may secure certain items or tools. For example, a secondary lock 18B may secure a power tool, a multimeter, access to a tool box, or other item involved in the maintenance, repair, or use of the physical resource or other equipment in the vicinity. In still other embodiments, several primary locks 18A may be used to secure different drawers, or doors, of a common cabinet or other container. Differential access may be provided to users for each of the different primary locks 18A through permissions managed by the access control server 12.

Furthermore, although in the present embodiment, secondary lock 18B comprises a smart lock controlled by electronic lock controller 14, it is contemplated that in other embodiments the secondary lock 18B may comprise a manual lock, such as a lock-and-key mechanism and shackle, a Tether Loop #, a Kensington #security lock, or other mechanical lock. Where permissions to open a primary lock 18A may be managed electronically, permissions to open a manual secondary lock 18B may be managed by proper distribution of physical keys, lock combinations, or similar. A secondary lock 18B comprising a manual lock may be particularly useful where electronic tampering of electronic locks is a concern, such as, for example, where the opened/close state of a cabinet may be tricked using magnets.

Figure 6:
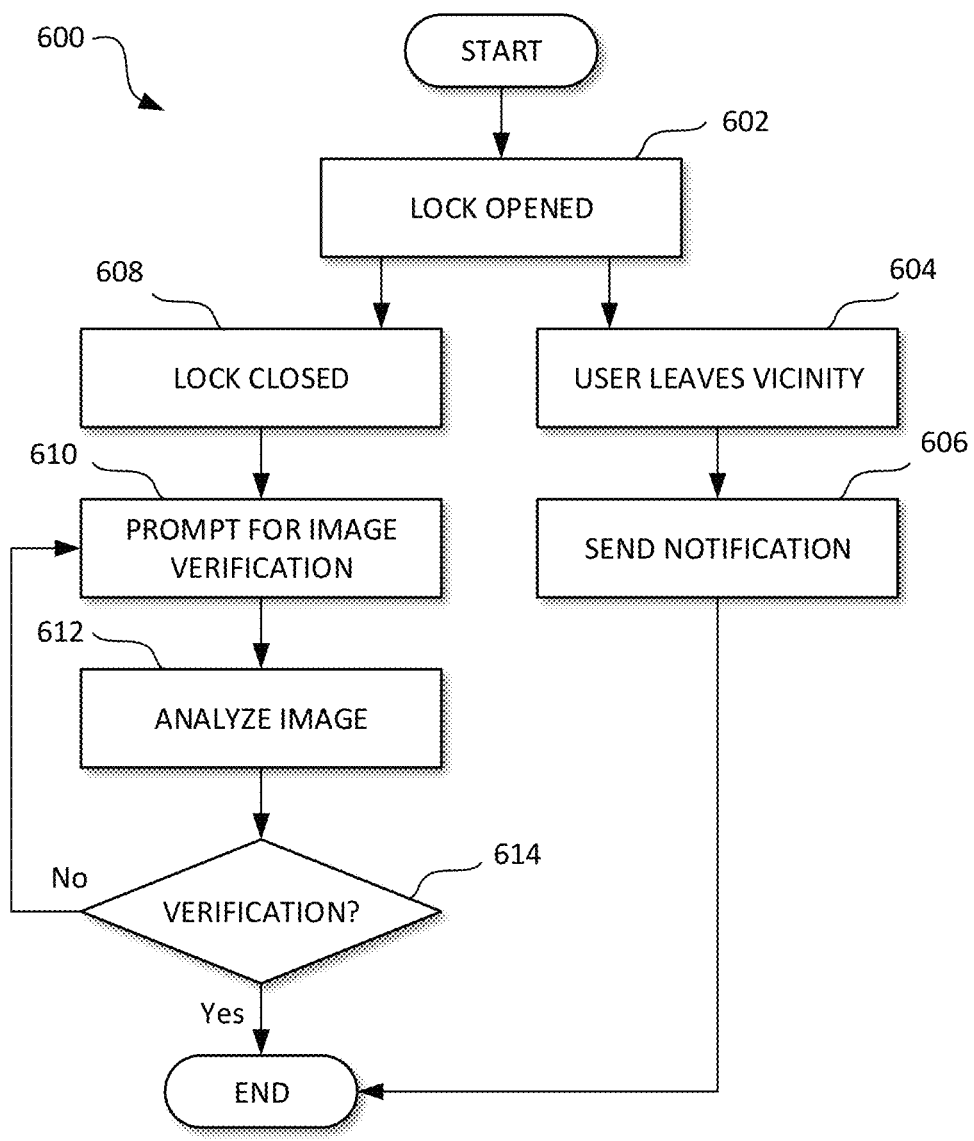
FIG. 6 is a flowchart of a method for verifying a physical resource is secured.

FIG. 6 shows a flowchart of a method 600 for verifying a physical resource is secured. It is to be emphasized that the blocks of method 600 need not be performed in the exact sequence as shown. Further, although the method 600 may be described as performed by a system and device discussed herein, but this is not limiting and the method can alternatively be performed by other systems and/or devices.

At block 602, a lock is opened by a user. As discussed above, a notification that a particular lock has been opened by a particular user is transmitted to an access control server. After the lock is opened, the user may leave the vicinity of the lock, with the lock still open, at block 604. At block 606, a notification is sent to the user reminding the user to return to the lock and close the lock. The event may also be recorded at the access control server and viewed by administrators.

Alternatively, after the lock is opened, the lock can be closed at block 608. As discussed above, at block 610, the user is prompted to capture an image to verify the integrity of the physical resource and/or lock. At block 612, the image is analyzed, by any of the techniques discussed above, to verify whether the lock and/or physical resource is properly secured. Analysis and recording of the analysis may take place on the user's mobile device or on the control access server. Where verification cannot be obtained, at block 610, such as where the image is improperly taken, block 610 may be re-executed.

Thus, automatic verification that a lock has been properly secured is provided, and an administrator's burden to monitor proper securement of physical resources is made more manageable.

Figure 7:
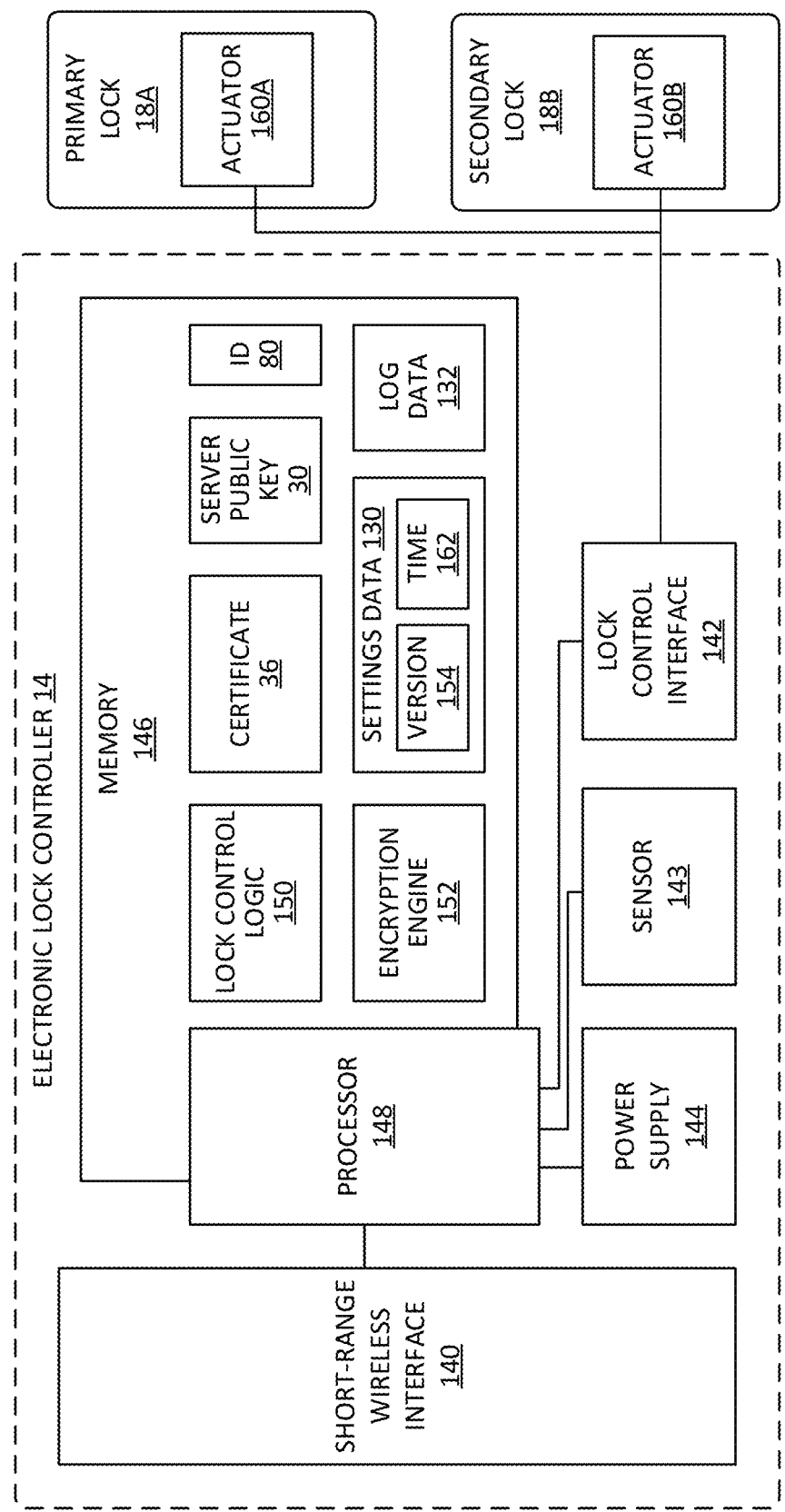
FIG. 7 is a diagram of an electronic lock controller.

FIG. 7 shows a block diagram of an electronic lock controller 14. The electronic lock controller 14 is one example of an electronic lock controller that can be used with the system 10.

The electronic lock controller 14 includes a short-range wireless interface 140, a lock control interface 142, a power supply 144, memory 146, and a processor 148. The short-range wireless interface 140 includes a short-range communications interface, such those discussed above (e.g., Bluetooth, BLE, etc.), configured for communication with wireless mobile devices 16 in vicinity of the electronic lock controller 14. The memory 146 includes any combination of ROM, RAM, flash memory, magnetic storage, optical storage, and similar for storing instructions and data as discussed herein. The processor 148 includes one or more CPUs, microcontrollers, microprocessors, processing cores, field-programmable gate arrays FPGAs, and similar. All or some of the memory 146 may be integrated with the processor 148. The processor 148 and memory 146 cooperate to execute instructions to cause the electronic lock controller 14 to perform the functionality discussed herein. In this embodiment, the electronic lock controller 14 notably excludes any long-range wired/wireless communications interface.

The lock control interface 142 is configured to provide signals to the locks 18A, 18B, and may also be configured to receive signals from the locks 18A, 18B. The lock control interface 142 can include an I/O port/bus or similar. Examples of signals that can be sent to the lock 18A, 18B include an unlocking signal that unlocks the lock 18A, 18B and a locking signal that locks the lock 18A, 18B. Examples of signals that can be received from the lock 18A, 18B include a status signal indicating whether the lock 18A, 18B is locked or unlocked. In this example, the locks 18A, 18B include driving circuity and an electrical actuators 160A, 160B such as motor, solenoid, or similar that converts electrical power into mechanical movement of the respective lock 18A, 18B according to signals received from the lock control interface 142. In other examples, the lock control interface 142 includes one or both of such driving circuity and electrical actuator.

The power supply 144 is configured to provide power to the electronic lock controller 14. The power supply 144 may also be configured to provide power to the primary lock 18A if the lock does not have its own power supply. Examples of suitable power supplies 144 include batteries, wind generators, solar panels, a combination of such, and the like. Multiple power supplies 144 of the same or different types can be provided for redundancy.

The lock controller 14 is configured to store a digital certificate 36, the digital certificate 36 being digitally signed by the private key 32 of a server 12 previously. The digital certificate 36 includes public and private keys for the lock controller 14. The lock controller 14 is further configured to store the public key 30 of the server 12. The electronic lock controller 14 further stores its identifier 80, so that the lock controller 14 can consider only lock-access data containing the identical identifier 80 as valid.

The electronic lock controller 14 includes lock control logic 150 and an encryption engine 152. The control logic 150 is configured to transmit the public key of the digital certificate 36 to wireless mobile devices 16 through the wireless interface 140, so that the wireless mobile devices 16 may securely communicate with the lock controller 14. The control logic 150 is further configured to control the encryption engine 152 to decrypt encrypted lock-access data contained in messages received from wireless mobile devices 16 via the wireless interface 140. Decryption is performed using the private key of the digital certificate 36, so as to obtain decrypted lock-access data. The control logic 150 is further configured to validate the authenticity of any received lock-access data using the public key 30 of the server 12. The lock control logic 150 is also configured to check authenticated lock-access data against internal settings data 130 and to the control the lock control interface 142 to unlock a lock 18A, 18B, as permitted by lock-access data, so as to grant access to the physical resource 20 and/or to the primary lock 18A, as appropriate. Settings data 130 stores settings of the electronic lock controller 14, including at least the internal time 162 of the lock controller 14. The lock control logic 150 references the internal time 162 when determining whether to actuate a lock 18A, 18B based on received lock-access data. Settings data can also include version data 154 for comparison with version data received in lock-access data from a wireless mobile device 16 requesting access to the physical resource. The lock control logic 150 is configured to compare received version data with stored version data 154 as a condition to grant access to the physical resource. Version data is thus a check as to whether the user of the wireless mobile device 16 is still permitted to access the resource after a version update has been made to deny one or more other users access to the resource.

The lock control logic 150 is further configured to record instances of access to the physical resource as log data 132. Further, the lock control logic 150 can be configured to use the encryption engine 152 to encrypt the log data 132 using the public key 30 of the server 12. The lock control logic 150 transmits messages containing log data, whether encrypted or not, to any wireless mobile devices 16 in vicinity of the wireless interface 140 for transport back to the server 12.

The electronic lock controller 14 further includes a sensor 143 which provides supporting evidence of the status of the locks 18A, 18B and access to the physical resource. The sensor 143 may include a light sensor configured to detect changes in ambient lighting when an open/closed state of the physical resource 20 is changed. The electronic lock controller 14 can then store indications of the changes in ambient lighting to represent changes in the open/closed state of the physical resource 20. For example, in embodiments where the electronic lock controller 14 is situated inside a closed physical resource such as a cabinet, the sensor 143 can include a light sensor which, when the cabinet is opened, detects a change in ambient lighting. The lock controller 14 can then record an indication of the opening to be stored in log data 132. Conversely, an indication that the cabinet door has been closed can be recorded. Where the physical resource is opened, the ambient light detected can be compared to the quantity or character of ambient light expected based on the day and time at which the physical resource was accessed and the geographic location of the physical resource. Ambient light data can thereby be used to detect where the light sensor is being tricked by, for example, a flashlight or other artificial light source.

The lock control logic 150 can be configured to broadcast a status of any data stored at the electronic lock controller 14, including settings data 130 and log data 132. Status for settings data can include an indication of the last time that the lock controller's internal time 162 was adjusted or an indication that a time check and potential adjustment is required. It is contemplated that a lock controller's internal time may be incorrect due to a variety of reasons, such as clock drift, power loss events, daylight savings mismatches, and similar. Maintaining an accurate internal time advantageously allows for more thorough control of access to the resource, in that expired or early lock-access data cannot be used to gain access.

A status notification for version data 154 can include an indication of the last time that the version data 154 was updated or an indication of the version data itself.

A status notification for log data 132 can include an indication of new log data requiring transport to the server 12 and may further include an indication of a number/quantity of such log data.

Multiple of the above status notification examples can be combined into a single status notification that is broadcasted. The specific form of any broadcasted status notifications can be varied and is not particularly limited. Status notifications may be broadcasted in plaintext or as encrypted by, for instance, the public key 30 of the server 12. It is advantageous that the broadcasting of status notifications allows the lock controllers 14 to not be always connected to the network 24. This makes large deployments more practical where, rather than connecting each lock controller 14 to the internet, a plurality of wireless mobile devices 16 are used to relay data between the server 12 and the lock controllers 14. Instead of one user or a small group of users moving from lock to lock to maintain the lock controllers, the users themselves maintain the lock controllers without any intentional action needed.

The lock control logic 150 can be configured to receive messages containing encrypted settings data 130 from wireless mobile devices 16 via the wireless interface 140. The lock control logic 150 then uses the encryption engine 152 to decrypt the encrypted settings data using the private key of the certificate 36 and validates authenticity of the settings data using the public key 30 of the server 12. If the settings data 130 can be authenticated, then the lock control logic 150 updates the respective setting or settings of the lock controller 14.

FIGS. 8-11 show processes according to the present invention. These processes may be used with the system 10 or with another system. The processes will be discussed in the context of the system 10 for sake of explanation.

Figure 8:
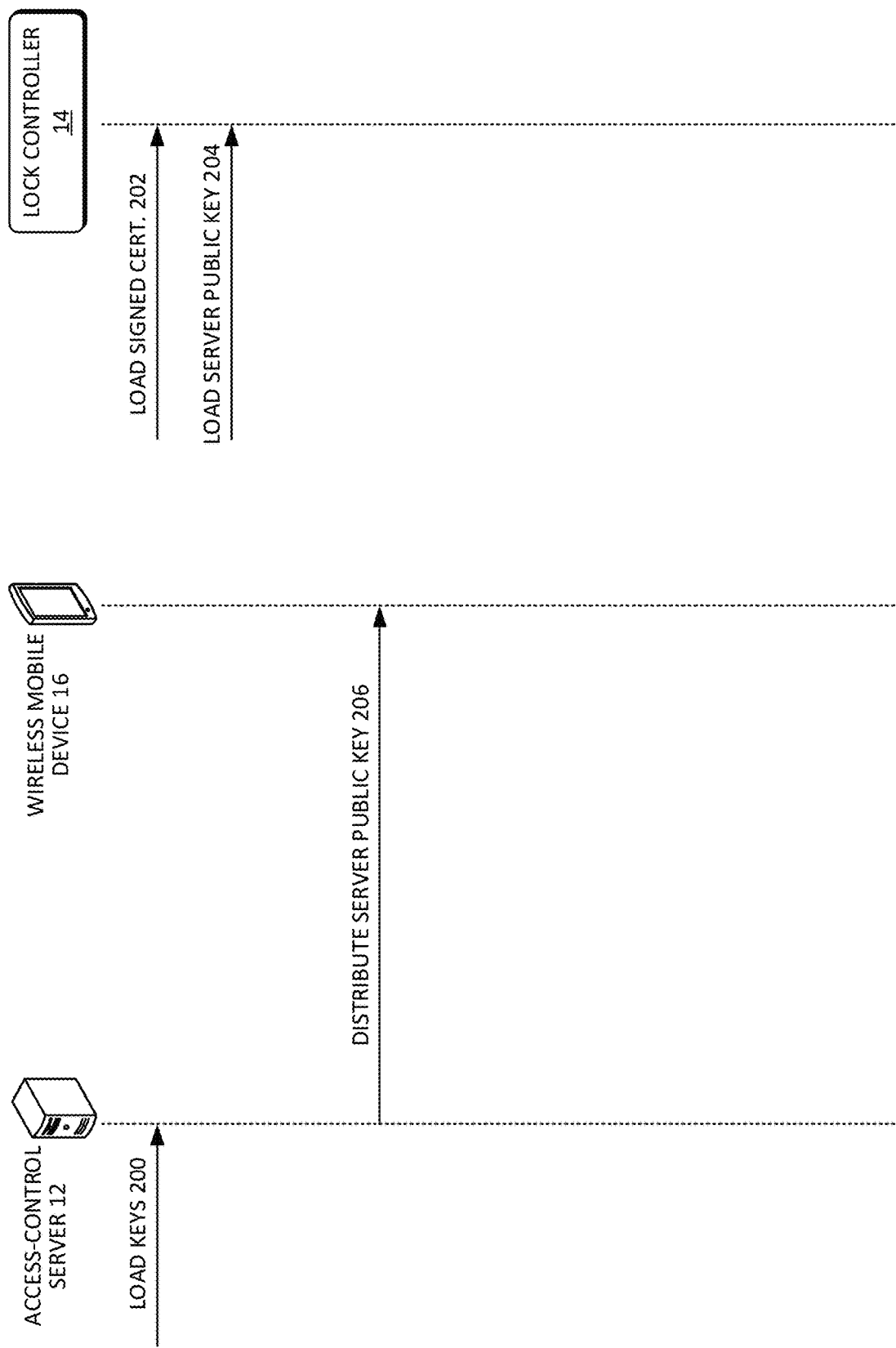
FIG. 8 is a diagram of a setup process.

FIG. 8 shows process for setting up the server 12, wireless mobile devices 16, and electronic lock controllers 14.

At step 200, a public and private key pair for the server is loaded onto the server 12 in a secure manner.

At step 202, a digital certificate is loaded onto each electronic lock controller 14. Each electronic lock controller 14 has its own unique digital certificate and each digital certificate has been digitally signed by the private key of the server 12. Each digital certificate has a different public and private key pair for the respective the electronic lock controller 14. Signing and certificate loading is preferably done in a secure environment, such as at a manufacturing facility or lock deployment facility.

At step 204, the public key of the server 12 is loaded onto each electronic lock controller 14. This can be done with step 202 or at another time, and is preferably done in a secure environment, such as at a manufacturing facility or lock deployment facility.

At step 206, the server's public key is distributed to each wireless mobile device 16. This can be done at any time and can be done periodically, as new devices are deployed and existing ones updated. For example, the server's public key can be transmitted to a wireless mobile device 16 after the user at the wireless mobile device 16 logs into his/her user account with the server 12.

The result of the setup process of FIG. 8 is that the server 12 digitally signs messages for each lock controller 14, passes these messages to respective wireless mobile devices 16, and that such devices 16, 14 can validate the authenticity of such data using the server's public key. Moreover, secure communications can be established between a wireless mobile device 16 and an electronic lock controller 14 using the signed digital certificate provided to the electronic lock controller 14.

Figure 9:
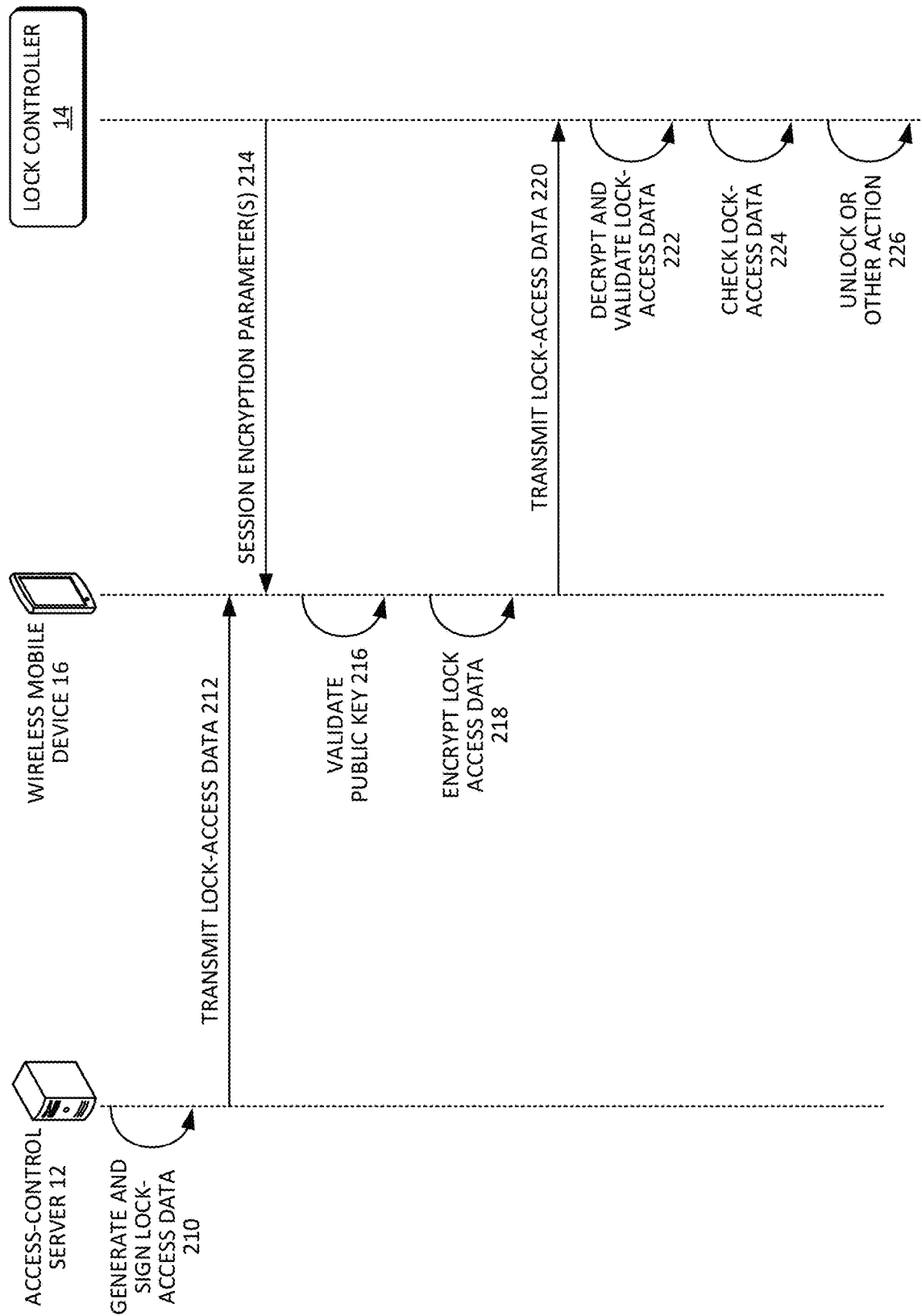
FIG. 9 is a diagram of an unlocking process.

FIG. 9 shows a process for securely controlling an electronic lock controller 14 to unlock its lock or to perform another action, after the setup process of FIG. 8 has been completed.

At step 210, the server 12 generates lock-access data for access to a specific physical resource or lock associated with a specific lock controller 14 by a specific user in possession of a wireless mobile device 16. Generation of lock-access data can be on demand as triggered, for example, by the user logging into his/her account with the server 12. Generation of lock-access data can alternatively or additionally be periodic, as controlled by a regeneration period and, optionally, a longer regeneration end time. The server 12 digitally signs all lock-access data with its private key.

At step 212, the server 12 transmits the signed lock-access data to the wireless mobile device 16 over a secure communications channel (e.g., TLS).

At some time in the future, the wireless mobile device 16 moves into the vicinity of the electronic lock controller 14. The user then expresses an intention through the wireless mobile device 16 to open a primary or secondary lock coupled to the lock controller 14. Where the user has the intention to access the physical resource, the user expresses an intention to open the primary lock. Where the user has the intention to remove the primary lock and/or electronic lock controller 14, the user expresses an intention to remove the secondary lock. This can be done via an application at the wireless mobile device 16, such as the application 134 discussed above. In response, the wireless mobile device 16 and lock controller 14 establish communications though a short-range wireless interface and session encryption parameters are shared, at step 214. Session encryption parameters include one or more randomized session variables. If the wireless mobile device 16 does not yet have the lock controller's certificate (e.g., this is the first instance of communication between the two devices), the wireless mobile device 16 requests it and the electronic lock controller 14 transmits its certificate to the wireless mobile device 16, at step 214. The wireless mobile device 16 can save certificates for the future use.

Next, at step 216, the wireless mobile device 16 uses the public key of the server 12 to validate the authenticity of the public key received from the electronic lock controller 14, as the certificates and therefore public keys distributed to legitimate electronic lock controllers 14 were digitally signed by the server's private key. This verifies that the lock controller 14 is not an impostor that has been set up, for instance, to steal valid, signed lock-access data from the system.

At step 218, the wireless mobile device 16 encrypts the lock-access data using the public key of the electronic lock controller 14. A random or pseudorandom session identifier may also be used when encrypting the lock-access data. A hardware-based random number generator can be used to generate session identifiers.

Then, at step 220, after validating the authenticity of the public key received from the lock controller 14, the wireless mobile device 16 transmits the encrypted lock-access data within a message to the electronic lock controller 14. It is noteworthy that this transmission does not rely on other or additional wireless encryption, such as that afforded by Bluetooth pairing, Wi-Fi WPA2, etc.

The electronic lock controller 14 receives the message containing the encrypted lock-access data, at step 222, and decrypts the encrypted lock-access data using its private key (and the session identifier, if used). The lock controller 14 then validates the authenticity of the decrypted lock-access data using the public key of the server 12, as legitimate lock-access data previously digitally signed by the server using its private key.

Next, at step 224, the lock controller 14 checks the decrypted lock-access data against its internal data, such as its identity, schedule data, and version data. One condition for unlocking the lock operated by the lock controller 14 is the lock controller 14 confirming that a lock-controller identifier 80 contained in the lock-access data matches the lock-controller identifier 80 stored in the lock controller 14. That is, the lock controller 14 only responds to lock-access data that correctly identifies the lock controller 14.

Internal time maintained by the lock controller 14 can be compared to start and end times for permitted access contained in lock-access data. For instance, the lock is only unlocked when the lock controller's internal time is between start and end times of the schedule data. Version data is an arbitrary number, code, token, or similar, as discussed above, that represents the lock-access data as being the most recent available from the perspective of the lock controller 14. For instance, the lock is only unlocked when the version data provided in the lock-access data matches the lock controller's own version data.

At step 226, the electronic lock controller 14 unlocks the lock, if permitted by the check performed to the lock-access data, at step 224. If the condition or conditions evaluated in step 224 result in a denial of access, other action can be taken at step 226, as discussed elsewhere herein. Moreover, it is contemplated that unlocking in merely one action that can be performed on the lock. Hence, step 226 can perform alterative or additional actions to unlocking, such as locking. Step 226 can also include logging the access or other action taken by recording, for example, the user identifier, time, and type of access or attempted access.

As can be understood from the process of FIG. 9, the lock controller 14 only responds to commands provided by a wireless mobile device 16 when such commands can be validated as being permitted by the server 12. This allows central control of physical access to distributed physical resources and locks. If a specific user is to be denied access, then this can be affected at the server 12 by withholding lock-access data containing current access start/end times and/or withholding lock-access data containing current version data. Further, some users may be afforded access to the physical resource itself, whereas other users may be afforded access to a lock. This can be done on the basis of individual lock controllers 14, so that access can be granted and revoked, as needed.

In some embodiments, lock-access data can be set to have a very short time window of validity, necessitating a user to authenticate with the server very near to the time (and place) of access to the physical resource or lock. This may improve security in some situations where network connectivity is available near the physical resource. In any event, the validity time of lock-access data can be selected to ensure security while at the same time allowing users enough time to physically reach the resource and associated locks.

Figure 10:
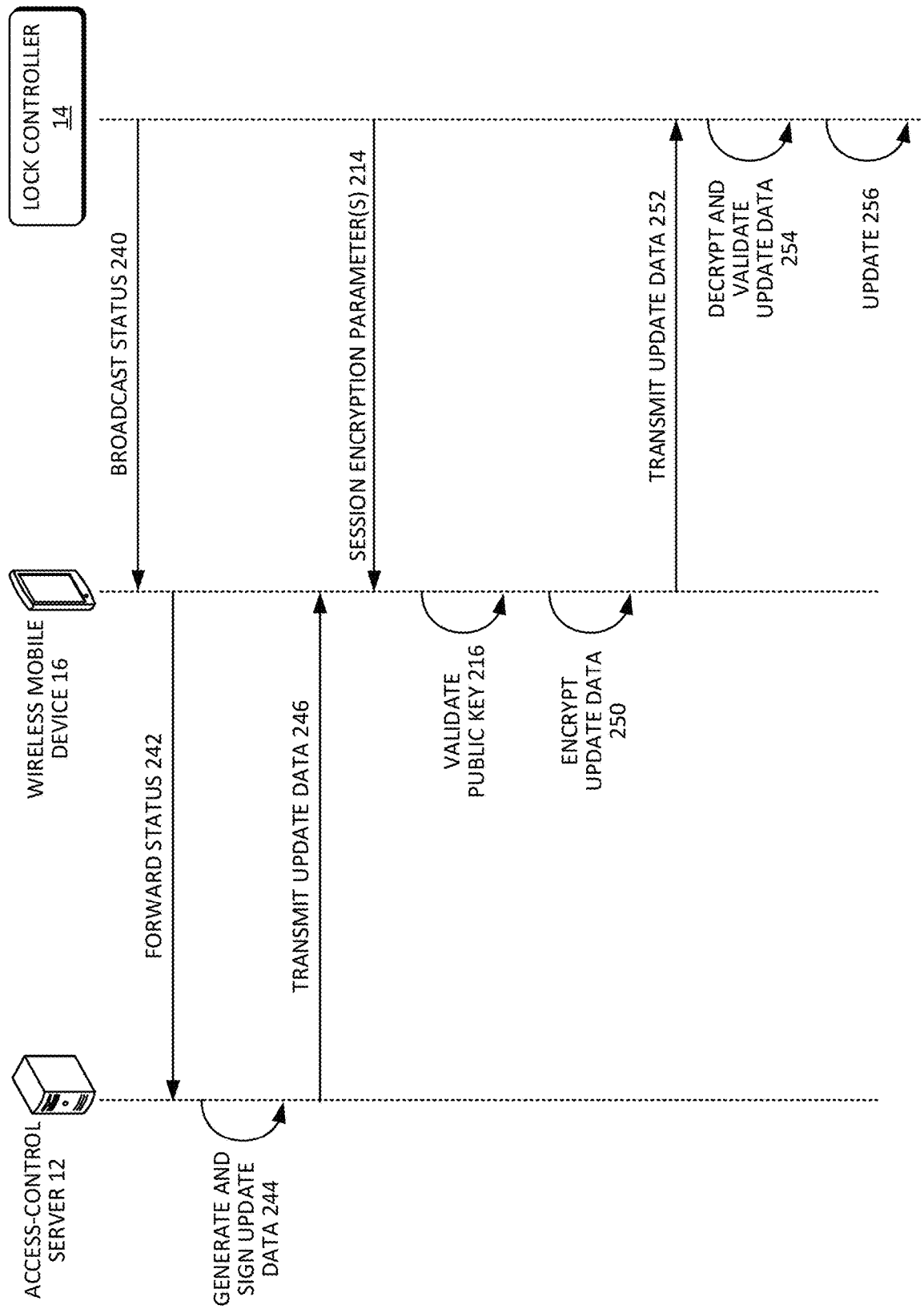
FIG. 10 is a diagram of an updating process.

FIG. 10 shows a process for securely updating data of the lock controllers 14. This process can be used to update any combination of version data, schedule data, other setting data at the lock controllers 14.

At step 240, a lock controller 14 broadcasts a notification of a status of its data. A status can be an indication that data at the lock controller 14 requires updating. Alternatively, the status can simply be an indication of the age of the data at the lock controller 14. The broadcasted status can be obfuscated or encrypted.

At step 242, a wireless mobile device in the vicinity of the lock controller 14 receives the broadcast and forwards the status to the server 12.

The server 12 then checks the status and generates update data if needed, at step 244. For example, the status indicates the internal time of the lock controller 14 and the server 12 compares the internal time to its own time and generates a new internal time or time correction to send to the lock controller 14 if the lock controller's time is not accurate enough. In another example, the status represents the version data at the lock controller 14 and the server 12 determines whether the version data requires an update. The server 12 signs update data with its private key.

Update data is then transmitted to the wireless mobile device 16, at step 246.

If this is the first interaction between the wireless mobile device 16 and the lock controller 14, the wireless mobile device 16 receives and validates the authenticity of the lock controller's certificate, in steps 214 and 216, as discussed above. Step 214, also includes sharing one or more session encryption parameters.

The wireless mobile device 16 uses the lock controller's public key to encrypt the update data, at step 250, before transmitting a message contained the encrypted update data to the lock controller 14, at step 252.

The lock controller 14 receives the message containing the encrypted update data, decrypts the update data, and uses the server's public key to validate the authenticity of the update data, at step 254.

If the update data is successfully validated, then the lock controller 14 implements the update represented by the update data, at step 256. The lock controller 14 thus updates its internal time, version number, or other setting so that access permissions are made current.

The update process of FIG. 10, or at least steps 244-256 of the process, can be performed before the access granting process of FIG. 9 for a communicating wireless mobile device 16 and lock controller 14, so that access permissions are made current before any access request by the wireless mobile device 16 is processed. This is useful because, for example, it may be the case that the wireless mobile device 16 facilitating the update to the lock controller 14 is to be denied access by the same update.

Figure 11:
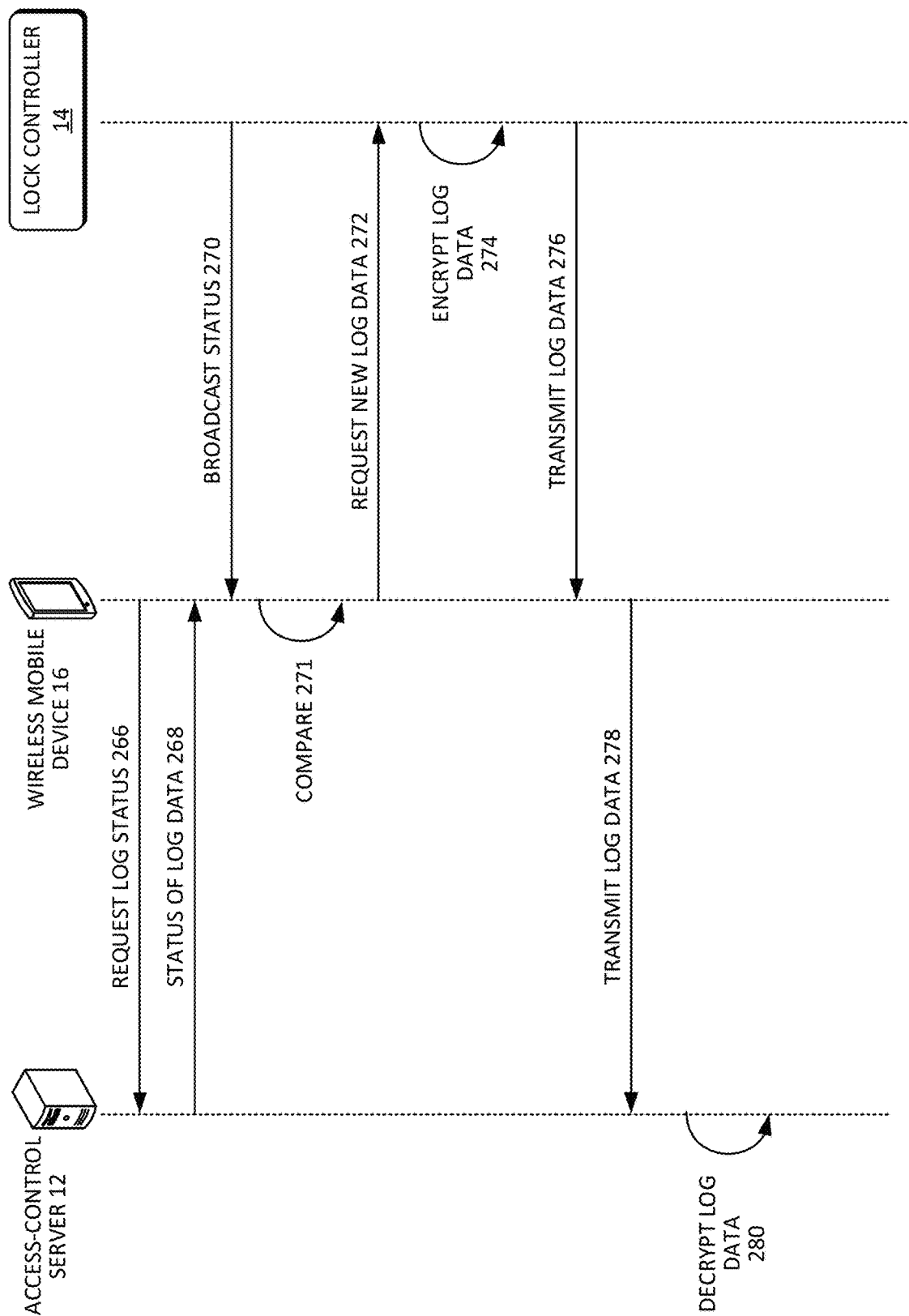
FIG. 11 is a diagram of a log capturing process.

FIG. 11 shows a process for securely collecting log data from the lock controllers 14. The log data is indicative of past access to the physical resource or associated locks via the electronic lock controller 14 and/or other actions taken by the user and lock controller 14.

At step 266, the wireless mobile device 16 requests from the server 12 a status of captured log data for the lock controller 14 with which the wireless mobile device 16 is communicating. In response, at step 268, the server 12 transmits to the wireless mobile device 16 a status indication of log data present on the server 12 for this lock controller 14. Log data status can include a number of log items stored at the server 12, for example.

At step 270, the lock controller 14 broadcasts a status notification for its log data. The status can be an indication of a quantity of log data at the lock controller 14. The broadcasted status can be obfuscated or encrypted. Step 270 can occur before or after steps 266 and 268.

At step 271, the wireless mobile device 16 receives the broadcast and compares the log-data indication received from the server 12 with that received from the lock controller 14 to determine if the server 12 lacks any log data. For example, the wireless mobile device 16 may determine that the lock controller 14 has indicated that it has more log items than the server 12 has, and hence that the additional new log data should be obtained from the lock controller 14 and sent to the server 12. The number of log items is used for the comparison, in this example. In other examples, an amount of log data (e.g., kB, MB, etc.) or a most recent log item timestamp can be used.

If there is new log data to obtain, at step 272, the wireless mobile device 16 sends a request for at least the new log data to the lock controller 14.

At step 274, the lock controller 14 encrypts the log data using the public key of the server 12 before transmitting a message containing the encrypted log data to the wireless mobile device 16, at step 276.

Then, at step 278, the wireless mobile device 16 transmits the encrypted log data to the server 12, which receives the encrypted log data and can then decrypt the log data using its private key, at step 280, store the log data, process it, and/or present the log data. In the case of poor mobile network coverage, step 278 may occur after the wireless mobile device 16 returns to coverage.

Further additional or alternative aspects of the present invention are described in the following.

Each time a user logs into the his/her account at the server 12, the server 12 may force the user's wireless mobile device 16 to delete all stored lock-access data and download fresh lock-access data from the server 12.

The application 134 at the wireless mobile device 16 can be configured to routinely delete expired lock-access data 62.

The lock control logic 150 of a lock controller 14 can be configured to require two or more elements of validated lock-access data 62 in order to provide access to the physical resource, or associated locks, to two or more different users at the same time. This adds an additional layer of security, in that two or more different users must be present at the lock controller 14 to gain access to the resource or associated locks, reducing the risk of theft or other undesirable occurrence.

Figure 12:
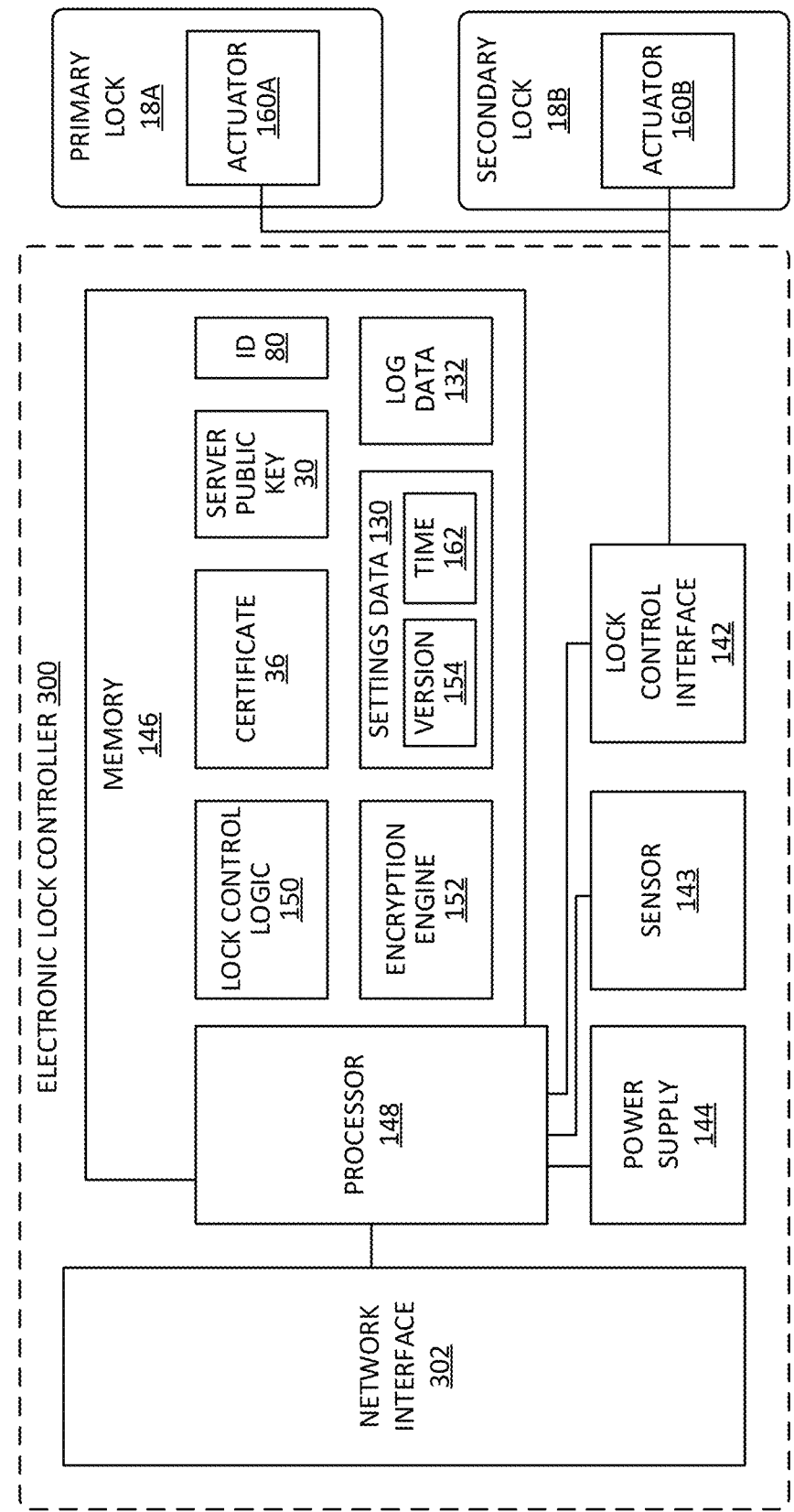
FIG. 12 is a diagram of another electronic lock controller.

FIG. 12 shows another embodiment of an electronic lock controller 300. This embodiment is similar to the embodiment of FIG. 7 and only differences will be discussed in detail. The lock controller 300 includes a network interface 302 configured for bidirectional data communications via the computer network 24. The network interface 302 includes a network adaptor and driver suitable for the type of network 24. This allows the electronic lock controller 300 to communicate with wireless mobile devices 16 through the internet or other component of the network 24. As such, access can be granted to a physical resource or associated lock outside of the proximity of the respective lock controller 300. For instance, a user with a wireless mobile device 16 can open a lock from a location remote to the lock, so as to grant physical access to another user who is physically located at the lock.

Figure 13:
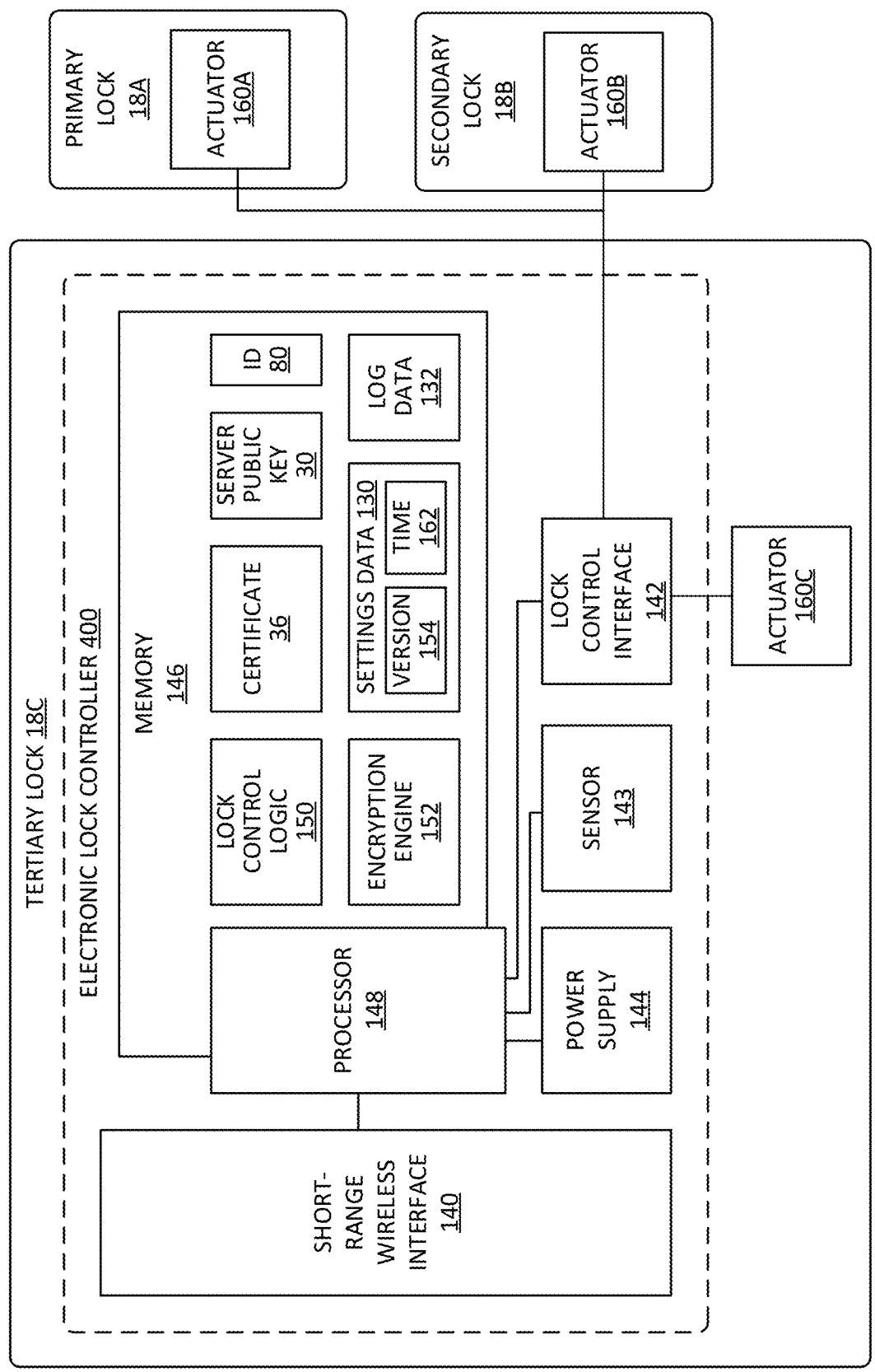
FIG. 13 is a diagram of another electronic lock controller having a tertiary lock protecting access to internal components of the electronic lock controller.

FIG. 13 shows another embodiment of an electronic lock controller, indicated as electronic lock controller 400. This embodiment is similar to the embodiment of FIG. 7 and only differences will be discussed in detail. The lock controller 400 includes a tertiary lock 18C, which includes driving circuity and an electrical actuator 160C, such as motor, solenoid, or similar that converts electrical power into mechanical movement of the tertiary lock 18C according to signals received from the lock control interface 142. The tertiary lock 18C protects the internal components of electronic lock controller 400 from tampering.

Access permissions to the locks 18A, 18B, and 18C, may be selectively distributed. Thus, some users may have access to primary lock 18A to access the physical resource, other users may have access to the secondary lock 18B to remove, replace, or relocate the electronic lock controller 400 and locks 18, and other users may have access to the tertiary lock 18C for performing maintenance, such as battery replacement, on the electronic lock controller 400.

Figure 14:
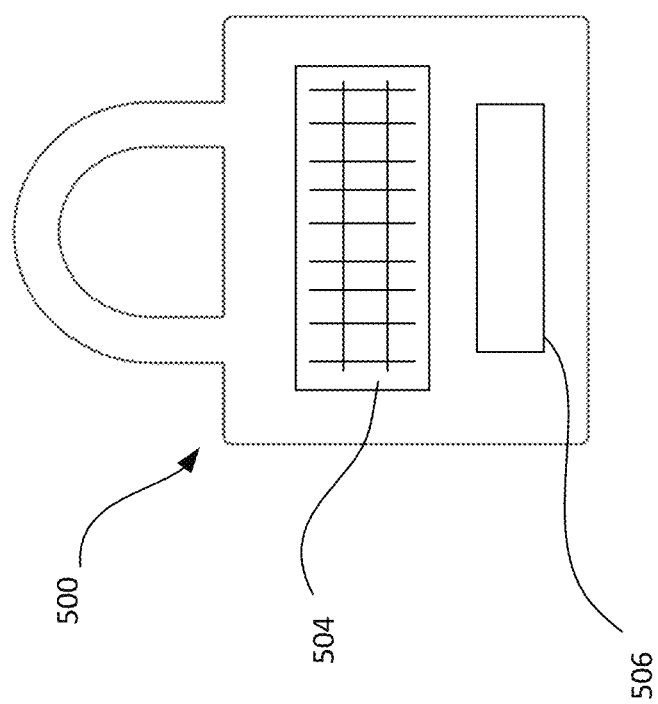
FIG. 14 is a diagram of a combined lock and lock controller having a solar panel and capacitive touch panel.
Figure 15:
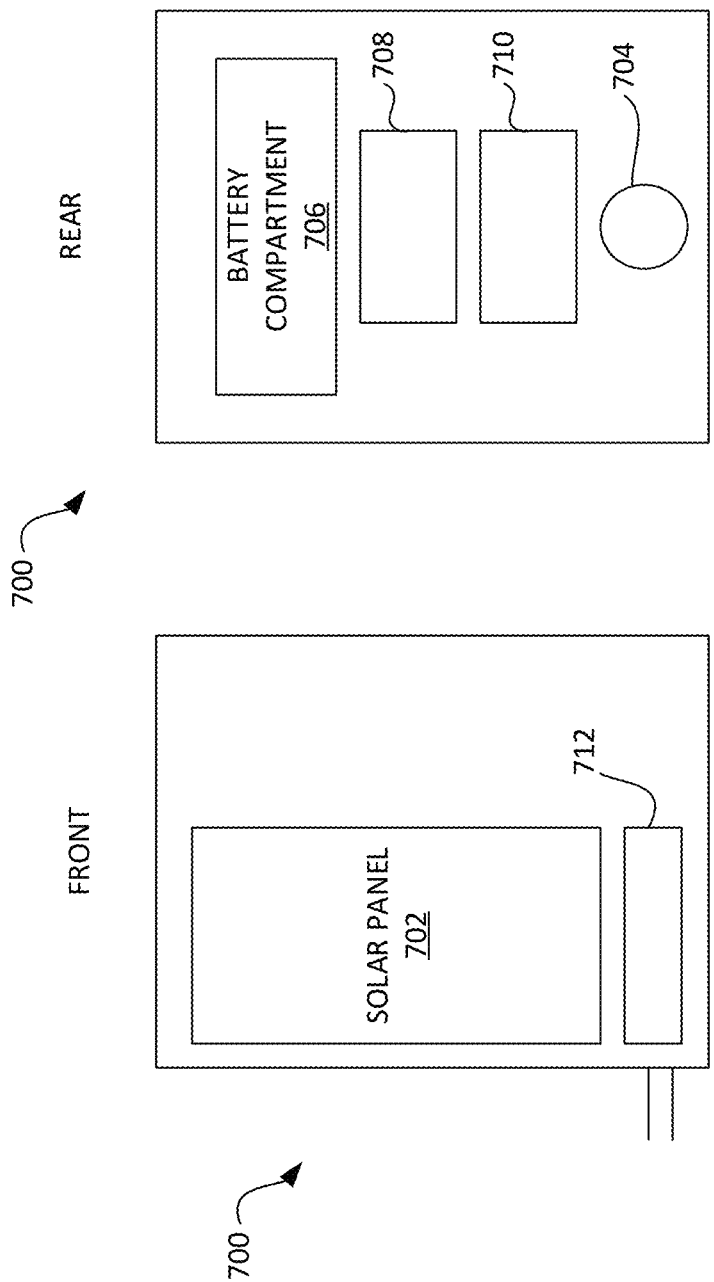
FIGS. 15A and 15B are diagrams of a solar power system installed on a cabinet storing a physical resource.
Figure 16:
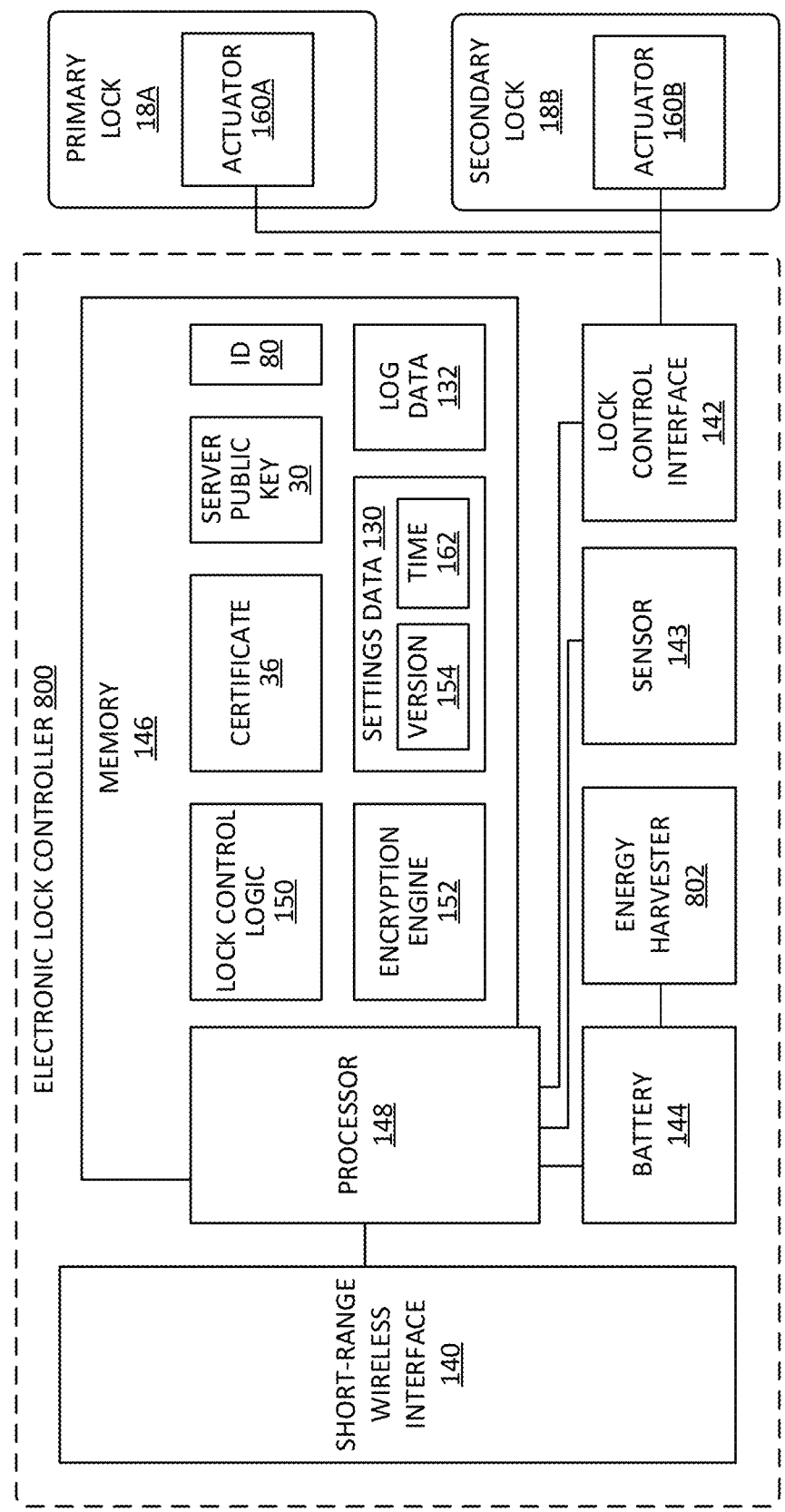
FIG. 16 is a diagram of another electronic lock controller having an energy harvester.

Turning to FIGS. 14, 15, and 16, additional powering options for electronic lock controllers are described. An electronic lock can include an internal or external rechargeable battery and/or other power source which can remotely generate power. An electronic lock requires power in the form of idle current that is quite low, such as picoamperes, but often requires high current spikes in the range of milliamperes to amperes when unlocking or communicating with mobile devices. Often a battery is used to provide the needed current. However, batteries often have a limited service lifetime and may need recharging or replacement, which increases maintenance requirements and may detrimentally affect security.

FIG. 14 is a diagram of a combined electronic lock and lock controller having a solar panel and capacitive touch panel. A combined lock and lock controller, hereinafter referred to as an electronic lock, is indicated generally at 500. The electronic lock 500 includes a rechargeable battery (not shown). The electronic lock 500 includes a solar panel 504 on an outside surface of the electronic lock 500 to recharge the battery.

The electronic lock 500 further includes a capacitive touch panel 506 for detecting a touch/swipe gesture from a user to wake up the electronic lock 500 from a low-power sleep mode. Waking the electronic lock 500 using the capacitive touch panel 506 serves as a low-power option for controlling the electronic lock 500. The electronic lock 500 can further include waterproofing features.

In other embodiments, the solar panel can be a component of a solar power system electrically coupled to the electronic lock 500 and stored elsewhere in the vicinity of the electronic lock 500.

FIG. 15A is a diagram of a solar power system 700 attached to a cabinet, from the front, and FIG. 15B is a diagram of the solar power system 700, viewed from the rear. The solar power system 700 includes a solar panel 702, and includes an attachment component that includes one or more of a magnetic backing or mounting screws allowing the solar panel 702 to be fixed to steel doors, frames, cabinets, in the vicinity of the electronic lock 500.

Where the solar power system 700 is attached to a container such as a cabinet, the solar power system 700 can additionally or alternatively include a connector on its rear side allowing the solar panel's wires to enter through a conduit 704 in the door/cabinet. The solar power system 700 can additionally or alternatively include an inner bracket that is mounted on the inside of the cabinet. The inner bracket serves as the holding bracket for which to mount the screws to secure the solar panel 702 to the front of the door/cabinet. Additionally, the inner bracket supports a battery compartment 706 which houses one or more rechargeable batteries which are charged by the solar panel 702. The inner bracket also supports a power connector 708 from the solar panel 702 to the batteries in compartment 706. The inner bracket also supports an electronics compartment 710 housing electronics required to charge a battery from the solar panel 702. In some embodiments, the electronics required to charge the battery may be stored in the lock controller of the electronic lock 500.

The solar power system 700 can additionally or alternatively include a battery connector 712 allowing direct pass through of power from the outside of the door/cabinet to the connected electronic lock 500, such that if the batteries of the solar power system 700 are dead or broken, the electronic lock 500 can still be powered from the outside via external battery.

The solar power system 700 can include a charge pump to regulate output of the solar panel 702. Any batteries can thus be trickle charged. A small amount of power, such as about 5 mW as averaged over a day, may be required to keep the batteries charged.

In some embodiments, several solar panels 702 may be affixed to differently oriented surfaces to help ensure that the electronic lock 500 will receive power in various use cases. For example, with locks placed against industrial cabinets, one side of the lock may be blocked from collecting solar energy by the cabinet. An electronic lock 500 placed on a metal fence may be able to collect power from both sides of the lock. Moreover, having solar panels/cells affixed to several differently aimed surfaces may allow an electronic lock 500 to be installed backwardly facing, intentionally or unintentionally, without loss of functionality and power. In addition, using multiple solar panels/cells allows for redundancy if one were to be destroyed or otherwise rendered nonoperational.

Further, a solar panel/cell may be provided as tuned to the light output of a mobile device's screen or camera flash, which may allow a user of such device to "jumpstart" the battery 144 when in low light conditions.

FIG. 16 is a diagram of another electronic lock controller having an energy harvester, indicated as an electronic lock controller 800. This embodiment is similar to the embodiment of FIG. 7 and only differences will be discussed in detail. The lock controller 800 includes a rechargeable battery 144 coupled to an energy harvester 802. The energy harvester 802 is configured to charge the battery 144, at least when needed to interact with wireless mobile devices 16 and drive electrical actuators 160A, 160B, to control the locks 18. The energy harvester 802 can slowly charge the battery 144 to keep the electronic lock controller 800 operational and to provide any necessary current when the electrical actuators 160A, 160B are to be driven.

The energy harvest 802 can include a mechanism coupled to a dynamo or similar mechanical-to-electrical energy converter. The mechanism can be manipulated by a user to charge the electronic lock controller 800 prior to use. Example mechanisms include a button which can be depressed and released one or more times, a rotatable dial, a cantilevered or spring-held weight (e.g., a mechanism that can be shaken to generate power), a finger-hole spinning mechanism that allows the user to rotate a crank/shaft, or similar. Gearing and/or springs may be included in the mechanism to allow the user to generate enough energy to charge a bank of capacitors and power the electronic lock controller 14 long enough to advertise its wireless functionality, and allow a mobile device to connect/control and activate the unlocking function.

In various embodiments, the energy harvester 802 includes an electromagnetic energy harvester to collect energy from, for example, radio-frequency (RF) waves. Locks may be deployed very close to high-powered RF sources. In the case of cell towers, the cabinets at the base of the tower may be exposed to higher than average powered radio waves and provide enough energy to trickle charge the battery 144. Hence, the energy harvester 802 may include a suitable antenna affixed to a housing of the lock. The antenna may be tuned to the same radio frequency provided by the tower (e.g. 800 MHz) and combined with a suitable energy harvesting integrated circuit.

In another example of the energy harvester 802 including an electromagnetic energy harvester, a device similar or identical to a charging mat (for example, an inductive coil or a charging mat according to existing Qi or A4WP standards) is placed on the interior side of the door of a cabinet guarded by a lock 18. The battery 144 or battery charging circuit may include a complementary inductive coil or similar device. Thus, the charging mat may provide sufficient power to the electronic lock controller 800 on the outside of the door to keep it sufficiently charged at all times. This example may be suitable for an industrial cabinet having the electronic lock controller 800 and lock 18 as a unit that may hang very close (if not touching) the cabinet door. Hence, power may be provided from the inside of the cabinet by induction.

In various embodiments, the energy harvester 802 includes one or more Peltier elements (tiles). One or more Peltier tiles may be affixed to the exterior of the housing of the lock, such that a person's body heat may provide enough power to jumpstart the electronic lock controller 800 via the thermoelectric effect. This may be suitable for locks used in low-temperature environments, where the difference in temperature outdoors is significantly different from the temperature of the human body (e.g. where outdoor temperatures are <5 degrees Celsius). Noting that lithium ion/polymer based batteries face operational difficulties in sub-freezing temperatures, using one or more Peltier elements may be quite effective in those conditions. In environments where the lock is exposed to direct sunlight, the lock may be placed on an industrial cabinet with one part of the lock being exposed to direct sunlight and another part of the lock near or in contact with a metal side of the industrial cabinet. This may provide a suitable temperature differential for an energy harvester 802 having one or more Peltier elements.

In various embodiments, the energy harvester 802 includes an interface for powering the electronic lock controller 800 via a supplemental wired connection. For example, the energy harvest 802 can be charged by a mobile device's 16 USB-OTG (On-The-Go) functionality. In one of such examples, a USBOTG cable is provided with the lock, for example, retracting into the housing similar to retractable cord in a vacuum cleaner or hairdryer. In another example, a USB-OTG connector on the housing of the lock, where such connector can be inserted into a USB port of the wireless mobile device 16. In another example, a USB-OTG cable is provided as part of the industrial cabinet/enclosure, so it can be used in emergency situations by a technician as needed.

In various embodiments, the battery 144 may contain a logic circuit that provides additional functionality to the electronic lock controller 800 or to another device that uses the battery 144, such as an electronic appliance or toy. Such a battery 144 may be termed a smart-battery. The smart-battery includes one or more electrochemical cells and may include a micro-transmitter/receiver (e.g. a Bluetooth transceiver) and a microcontroller that allow a wireless mobile device 16 to communicate with the smart-battery. The smart-battery may include a microcontroller within the housing of a conventional battery itself, or alternatively, a microcontroller may be inserted between a conventional battery and the battery's connector in the device. In either case, the battery with built-in microcontroller, or the battery coupled to an external microcontroller, may be termed a smart-battery. The microcontroller and RF capabilities can be powered as needed by the battery itself, or disabled when not desired. When placed (in series circuit, or alone) in a battery-operated device (e.g. the electronic lock controller, a toy, etc.) the smart-battery controls the output of the circuit by switching on/off the power as desired. The smart-battery can thus offer various versions of power control capabilities to control the output of the cell. Examples of such include manual on/off, programmed on/off times (wake at 7 am, off at 8 am), timed auto-shutoff after period (e.g. 10 minutes of use), or enhanced programming and real-time control of these features via a mobile device (smartphone). Electronic lock controllers can thereby be controlled via smart-batteries.

Another example application is where this smart-battery is used as 1 of 4 AA batteries in a child's toy. Installing this alongside three standard AA batteries could provide 4.8V-6V of power to the toy. However, as children often leave the power enabled on their toys, this battery may be provided with auto-shutoff capabilities, or broadcast warnings to mobile devices in the general vicinity. Nearby mobile appliances (mobile phones or gateways) may be programmed to interpret these warnings and notify people of the still powered appliance. A similar example is possible with electronic locks, whether of the kind discussed herein or consumer grade locks that people may installed on their front doors. While it is known for devices to have such functionality (e.g. auto-shutoff) integrated into the device, may devices often omit such functionality to reduce overall cost. The smart-battery may solve this problem as it can be removed, recharged, or ported to different devices allows the "smart" functionality to exist in all types of electronics (electronic lock controllers, appliances, toys). A standard for the smart-battery to interact with various devices may be created.

Further, a smart-battery may be configured to incorporate a signaling protocol in its DC output to allow a device to incorporate advanced control capabilities. For example, a mobile device can be configured to communicate simple instructions (up, down, left, right) to the smart-battery, and the smart-battery can be configured to relay those instructions to the appliance/toy using a signaling protocol within the power stream. As such various kinds of electronics can be created smaller and cheaper due to omitting control hardware, where control is provided through the smart-battery. A smart-battery can thereby power up an electronic device, use an encoded signal, such as a series of voltage spikes and drops, to communicate with the smart-battery-enabled device. The smart-battery may communicate the type of battery installed, the amount of battery power left, as well as control instructions provided by a mobile device.

Other advantages include that various kinds of appliances and toys need not be certified for wireless use, as the smart-battery could be certified. This may lead to even more low cost appliances and devices joining the Internet of Things (IOT) world.

In view of the above, numerous advantages of the present invention should be apparent. Access to physical resources, which may be remote or infrequently accessed, can be readily centrally controlled while maintaining a fully set of access permissions only at the server. Differential access can be provided to users having access to the physical resource and to users having access to the locks themselves. Further, the lock controllers need not be aware of the full set of access permissions for all users, and simply need to respond to received digitally signed lock-access data. The lock controllers do not even require their own data connectivity and instead can use any nearby wireless mobile device as a conduit to the server. In addition, revoking access to one or more users is readily achievable without having to distribute new keys.

Authorization to open one or more of a primary lock, secondary lock, and tertiary lock, can be provided to a given user through permissions managed by an access control server. These permissions can be time-based and can be set to expire or renew, as desired.

Reliance on network-specific encryption and authentication mechanisms is avoided, as many, such as WPA and Bluetooth 4.0, have been shown to be vulnerable. In contrast, the present invention is transport-agnostic by virtue of the use of digital certificates. The present invention can operate without dependence on Bluetooth or WLAN security, and hence can be readily ported to multiple (and future) wireless technologies, while avoiding the pitfalls of current wireless security protocols.

The use of digital certificates and the broadcasting of status notifications enables multiple devices to control/update any lock controller, with the users of such devices being aware of the update/control. Dependence on special manager/admin devices is reduced or eliminated. Further, the broadcasting of status notifications avoids each mobile device connecting to a lock controller having to check for log data or update requirements. Polling is avoided. Instead, mobile devices within range are notified of lock-controller state changes and respond appropriately.

Moreover, the use of digital certificates and version data enables effective scaling to many users (e.g., thousands or more users in enterprise deployment of resources), as each lock controller need not know each user's permissions. Rather, each lock controller need only respond to valid lock-access data. Further, a lock controller can be configured to respond only to multiple elements of lock-access data provided by different devices for even greater security.

In addition, the present invention provides for real-time unlocking decisions based on a mobile device's connectivity with a server, and not on a lock-controller's ability to connect to the server.

While the foregoing provides certain non-limiting examples, it should be understood that combinations, subsets, and variations of the foregoing are contemplated. The monopoly sought is defined by the claims.

What is claimed is:
1. A wireless mobile device comprising:
a network interface;
an imaging device; and
a processor coupled to the network interface and the imaging device, the processor configured to:
direct a user to capture an image of a lock with the imaging device; and
initiate an analysis of the image to determine that the lock properly secures a physical resource, wherein the analysis of the image comprises identifying a visual market positioned on or in proximity to the lock, the visual marker configured to distinctly indicate using contrast the lock properly or improperly securing the physical resource, wherein the processor is to perform the analysis of the image or transmit, via the network interface, the image to a server that is to perform the analysis of the image.

2. The device of claim 1, wherein the visual marker is configured to appear broken when the physical resource is improperly secured.

3. The device of claim 1, wherein the processor is configured to initiate an alert when the analysis of the image determines that the lock improperly secures the physical resource.

4. The device of claim 1, further comprising a user interface coupled to the processor, wherein the processor is further configured to display overlay at the user interface to assist the user to frame the lock and the physical resource in the image.

5. The device of claim 1, further comprising a user interface coupled to the processor, wherein the processor is further configured to display an example image or video through user interface to show an example lock being properly secured and to indicate how the image should be captured.

6. The device of claim 1, wherein the analysis of the image is performed using machine-learning image classification.

7. The device of claim 1, wherein the processor is configured to interface with a lock controller at the lock to unlock the lock using a cryptographic scheme.

8. A server comprising:
a network interface;
a processor coupled to the network interface, the processor configured to:
receive an image of a lock from a remote wireless device via the network interface, the image being captured by the remote wireless device; and
perform an analysis of the image to determine that the lock properly secures a physical resource at the location of the remote wireless device, wherein the analysis of the image comprises identifying a visual marker positioned on or in proximity to the lock, the visual marker configured to distinctly indicate using contrast the lock property or improperly securing the physical resource.

9. The server of claim 8, wherein the processor is configured to initiate an alert when the analysis of the image determines that the lock improperly secures the physical resource.

10. The server of claim 8, wherein the processor is configured to:
receive a notification from the remote wireless device via the network interface that the lock has been opened; and
initiate an alert when the image is not received within a period of time after the lock was opened.

11. The server of claim 8, wherein the processor is configured to:
determine that the wireless mobile device has left the vicinity of the physical resource; and
initiate an alert when the image is not received after the lock was opened and the wireless mobile device was determined to have left the vicinity of the physical resource.

12. The server of claim 8, wherein the analysis of the image comprises identifying a visual marker positioned on or near the lock and configured to show the lock as properly or improperly securing the physical resource.

13. The server of claim 8, wherein the analysis of the image is performed using machine-learning image classification.

14. An electronic lock comprising:
a locking mechanism to secure a physical resource;
a short-range wireless interface;
a lock controller coupled to the locking mechanism and the short-range wireless interface, the lock controller to unlock the lock according to a cryptographic scheme operable with a wireless mobile device in communication with the lock controller via the short-range wireless interface; and
a visual marker positioned on or in proximity to the locking mechanism to be captured by an imaging device of the wireless mobile device, the visual marker configured to distinctly indicate using contrast the lock properly or improperly securing the physical resource.

15. The electronic lock of claim 14, wherein the visual marker is configured to appear broken when the physical resource is improperly secured.

16. The electronic lock of claim 14, wherein the visual marker includes a light-emitting diode.

17. The electronic lock of claim 14, wherein the visual marker includes a machine-readable code.

* * * * *